US012800948B2

(12) United States Patent
Yu et al.

(10) Patent No.: US 12,800,948 B2
(45) Date of Patent: Nov. 17, 2026

(54) ANTI-CONDENSATION EYEWEAR

(71) Applicant: Gentex Corporation, Simpson, PA (US)

(72) Inventors: Haiping Yu, Simpson, PA (US); Taylor Worthington, Duryea, PA (US)

(73) Assignee: Gentex Corporation, Simpson, PA (US)

( * ) Notice: Subject to any disclaimer, the term of this patent is extended or adjusted under 35 U.S.C. 154(b) by 230 days.

(21) Appl. No.: 18/559,487

(22) PCT Filed: Jun. 3, 2022

(86) PCT No.: PCT/US2022/032088

§ 371 (c)(1), (2) Date: Nov. 7, 2023

(87) PCT Pub. No.: WO2022/256608

PCT Pub. Date: Dec. 8, 2022

(65) Prior Publication Data

US 2024/0241394 A1 Jul. 18, 2024

Related U.S. Application Data

(60) Provisional application No. 63/196,404, filed on Jun. 3, 2021.

(51) Int. Cl.

| | |
|---|---|
| ***G02C 11/00*** | (2006.01) |
| ***A42B 3/24*** | (2006.01) |
| ***G02C 7/10*** | (2006.01) |
| ***G02C 11/08*** | (2006.01) |
| *G02B 27/01* | (2006.01) |

(52) U.S. Cl.

CPC .............. *G02C 11/08* (2013.01); *A42B 3/245* (2013.01); *G02C 7/101* (2013.01); *G02B 27/0172* (2013.01); *G02B 2027/0178* (2013.01)

(58) Field of Classification Search

CPC .......... G02C 11/08; G02C 7/101; A42B 3/245

See application file for complete search history.

(56) References Cited

U.S. PATENT DOCUMENTS 4,682,007 A * 7/1987 Hollander .............. A42B 3/245 219/203

5,319,397 A 6/1994 Ryden (Continued)

FOREIGN PATENT DOCUMENTS

CN 204314562 U * 5/2015

OTHER PUBLICATIONS

Supplementary Search Report issued in corresponding European Patent Application No. EP 22816910, dated Mar. 6, 2025, 2 pages.

(Continued)

*Primary Examiner* — Richale L Quinn

(74) *Attorney, Agent, or Firm* — Morgan, Lewis & Bockius LLP

(57) ABSTRACT

An eye protection device is disclosed that includes a lens, a first transparent conductive layer (TCL) coupled to the lens and that covers a first heating area on the lens and a second TCL coupled to the lens and that covers a second heating area on the lens. The second TCL and second heating area are spaced from the first TCL and first heating area. The first TCL and second TCL are electrically connected to one another in series.

24 Claims, 12 Drawing Sheets

(56) References Cited

U.S. PATENT DOCUMENTS

| | | | | | |
|---|---|---|---|---|---|
| 5,466,911 | A * | 11/1995 | Spagnoli | H05B 3/84 219/203 |
| 5,617,588 | A | 4/1997 | Canavan et al. | |
| 5,671,483 | A * | 9/1997 | Reuber | A42B 3/245 2/435 |
| 5,806,102 | A * | 9/1998 | Park | A42B 3/245 2/9 |
| 7,740,353 | B2 | 6/2010 | Jannard | |
| 8,566,962 | B2 * | 10/2013 | Cornelius | G02C 11/08 2/15 |
| 9,072,591 | B2 * | 7/2015 | Cornelius | H05B 3/84 |
| 9,210,737 | B2 * | 12/2015 | Cornelius | H05B 1/00 |
| 9,398,981 | B2 | 7/2016 | Lebel et al. | |
| 9,419,520 | B2 * | 8/2016 | O'Malley | A61F 9/04 |
| 9,451,068 | B2 * | 9/2016 | Warren | G02C 11/06 |
| 9,494,807 | B2 * | 11/2016 | Jannard | A61B 5/6803 |
| 9,619,201 | B2 * | 4/2017 | Jannard | H04R 1/1066 |
| 9,720,258 | B2 * | 8/2017 | Reyes | G06F 3/01 |
| 10,073,282 | B2 * | 9/2018 | Saylor | G02C 7/101 |
| 10,222,617 | B2 * | 3/2019 | Jannard | G02C 11/06 |
| 10,295,821 | B2 * | 5/2019 | McCabe | G02C 11/08 |
| 10,925,772 | B2 * | 2/2021 | Saylor | A61F 9/028 |
| 11,039,505 | B1 * | 6/2021 | Parker | H05B 3/84 |
| 11,851,148 | B2 * | 12/2023 | Holopainen | B63C 11/12 |
| 11,994,750 | B2 * | 5/2024 | Berg | A42B 3/22 |
| 2002/0157175 | A1 * | 10/2002 | Dondero | A61F 9/028 2/436 |
| 2003/0019018 | A1 * | 1/2003 | Markovitz | A61F 9/026 2/441 |
| 2008/0290081 | A1 * | 11/2008 | Biddell | A42B 3/245 219/203 |
| 2013/0091623 | A1 * | 4/2013 | McCulloch | A61F 9/025 2/435 |
| 2013/0152283 | A1 * | 6/2013 | Domenico | A42B 3/245 2/424 |
| 2013/0212765 | A1 * | 8/2013 | Cornelius | G02C 11/08 2/15 |
| 2013/0229812 | A1 * | 9/2013 | Chen | A42B 3/245 362/362 |
| 2014/0027436 | A1 * | 1/2014 | Cornelius | H05B 1/00 219/211 |
| 2014/0033409 | A1 * | 2/2014 | O'Malley | G02C 11/08 323/299 |
| 2014/0063054 | A1 * | 3/2014 | Osterhout | G06T 19/006 345/633 |
| 2014/0374402 | A1 * | 12/2014 | Cornelius | G02C 11/08 219/211 |
| 2015/0121610 | A1 * | 5/2015 | Cornelius | H05B 1/02 2/435 |
| 2015/0290039 | A1 * | 10/2015 | McCulloch | A42B 3/24 2/439 |
| 2016/0359207 | A1 * | 12/2016 | Cornelius | H01M 10/615 |
| 2017/0215510 | A1 * | 8/2017 | Demers | A42B 3/222 |
| 2018/0052319 | A1 | 2/2018 | McCabe | |
| 2018/0239131 | A1 * | 8/2018 | Cornelius | G02B 27/0006 |
| 2019/0133238 | A1 * | 5/2019 | Tsai | G02C 7/16 |
| 2019/0227347 | A1 * | 7/2019 | Jimenez | G02F 1/1533 |
| 2021/0127454 | A1 * | 4/2021 | Alava | H05B 3/84 |
| 2021/0282493 | A1 * | 9/2021 | Dutour | A42B 3/245 |
| 2022/0273064 | A1 * | 9/2022 | Lee | A42B 3/245 |
| 2022/0342236 | A1 * | 10/2022 | Rehfeldt | G02C 11/04 |
| 2022/0361622 | A1 * | 11/2022 | Hartlieb | A42B 3/306 |
| 2023/0255302 | A1 * | 8/2023 | Levesque | A42B 3/245 2/15 |
| 2023/0350194 | A1 * | 11/2023 | Hazen | G02B 27/0006 |
| 2024/0241394 | A1 * | 7/2024 | Yu | G02B 27/0006 |
| 2024/0280840 | A1 * | 8/2024 | Worthington | G02C 7/102 |

OTHER PUBLICATIONS

Search Report and Written Opinion issued for corresponding International Patent Application No. PCT/US2022/032088 dated Sep. 8, 2022, 12 pages.

* cited by examiner

ANTI-CONDENSATION EYEWEAR

CROSS-REFERENCE TO RELATED APPLICATIONS

This application is a 371 National Stage Entry of International Patent Application No. PCT/US2022/032088 filed Jun. 3, 2022, which claims the benefit of U.S. Provisional Patent Application No. 63/196,404 filed Jun. 3, 2021 entitled "Anti-Condensation Eyewear", each of which is incorporated by reference herein in its entirety.

TECHNICAL FIELD

The present disclosure generally relates to eyewear and, in some embodiments, to eye protection devices for preventing or reducing the buildup of condensation on one or more lenses of the eye protection device.

SUMMARY

In one embodiment there is an eye protection device including a lens, a first transparent conductive layer (TCL) coupled to the lens and covering a first heating area on the lens, and a second TCL coupled to the lens and covering a second heating area on the lens, the second TCL and second heating area being spaced from the first TCL and first heating area. The first TCL and second TCL are electrically connected to one another in series.

In some embodiments, the eye protection device further includes a first bus bar extending along a portion of a periphery of the lens and electrically connected to the first TCL, and a second bus bar extending along another portion of the periphery of the lens and electrically connected to the second TCL, and the first and second bus bars are spaced from one another. in some embodiments, a third bus bar extending along another portion of the periphery of the lens opposite the first and second bus bar and between the first TCL and the second TCL, the third bus bar being electrically connected to the first TCL and second TCL. In some embodiments, the first bus bar, the second bus bar, and the third bus bar do not directly contact one another.

In some embodiments, the first bus bar and second bus bar each extend along a top surface of the lens by a distance generally equal to or less than a width of the first and second heating area respectively. In some embodiments, the first TCL and second TCL have substantially equal bulk electrical resistance values. In some embodiments, the lens includes a concave rear surface and a convex front surface, and the first and second TCL are mounted on the convex front surface of the lens. In some embodiments, there is no TCL disposed on the front surface of the lens in the space between the first heating area and second heating area. In some embodiments, the space between the first heating area and second heating area is configured to align with a nasal bridge of a user wearing the eye protection device.

In some embodiments, the eye protection device further includes a first anti-reflection (AR) layer substantially covering the first TCL and the second TCL such that the first TCL and second TCL are sandwiched between the lens and the first AR layer, and a second AR layer substantially covering a surface of the lens opposite the first AR layer. In some embodiments, the lens is a first lens and the eye protection device further includes a second lens, the second lens being spaced from the first lens such that a gap is formed between the first lens and the second lens. In some embodiments, at least one of the first lens and second lens includes a laser absorptive dye.

In some embodiments, the second lens is comprised of a ballistic grade material. In some embodiments, the first TCL and second TCL are mirror images of one another across a center line of the lens. In some embodiments, the first TCL and the second TCL each include indium tin oxide (ITO). In some embodiments, the first TCL and second TCL are powered through connection to a powered helmet rail configured to power a plurality of devices. In some embodiments, the lens includes a hydrophobic coating. In some embodiments, the eye protection device further includes an optical element configured to attenuate light based on ambient light conditions.

In some embodiments, the light attenuating optical element includes one or more of photochromic, electrochromic or liquid crystal technology. In some embodiments, the eye protection device further includes a laser light protective coating applied to the lens. In some embodiments, the eye protection device further includes a display device configured to project an image to the user's eye.

In another embodiment there is an eye protection device including a lens including a concave rear surface and a convex front surface, and a first transparent conductive layer (TCL) coupled to the convex front surface of the lens and covering a first heating area on the lens. The eye protection device further includes a second TCL coupled to the convex front surface of the lens and covering a second heating area on the lens, the second TCL and second heating area being spaced from the first TCL and first heating area, a first bus bar extending along a portion of a periphery of the lens and electrically connected to the first TCL, and a second bus bar extending along another portion of the periphery of the lens and electrically connected to the second TCL. There is a third bus bar extending along another portion of the periphery of the lens opposite the first and second bus bar and between the first TCL and the second TCL, the third bus bar being electrically connected to the first TCL and second TCL. The first bus bar and second bus bar are spaced from one another, and the first TCL and second TCL are electrically connected to one another in series.

In another embodiment, there is an eye protection device including a lens including a concave rear surface and a convex front surface, a first transparent conductive layer (TCL) coupled to the concave rear surface of the lens and covering a first heating area on the lens, and a second TCL coupled to the concave rear surface of the lens and covering a second heating area on the lens, the second TCL and second heating area being spaced from the first TCL and first heating area. There is a first bus bar extending along a portion of a periphery of the lens and electrically connected to the first TCL, a second bus bar extending along another portion of the periphery of the lens and electrically connected to the second TCL, and a third bus bar extending along another portion of the periphery of the lens opposite the first and second bus bar and between the first TCL and the second TCL, the third bus bar being electrically connected to the first TCL and second TCL. The first bus bar and second bus bar are spaced from one another, and the first TCL and second TCL are electrically connected to one another in series.

In another embodiment, there is an eye protection device including a first lens including a concave rear surface and a convex front surface, a first transparent conductive layer (TCL) coupled to the convex front surface of the first lens and covering a first heating area on the lens, and a second TCL coupled to the convex front surface of the first lens and covering a second heating area on the lens, the second TCL and second heating area being spaced from the first TCL and first heating area. There is a second lens including a concave rear surface and a convex front surface, the second lens being spaced from the first lens such that a gap is formed between the first and second lens. There is a first and second reinforced coating applied to the concave rear surface and convex front surface of the second lens, and a first anti-reflective layer positioned on the convex front surface of the first lens and covering at least the first and second TCL. There is a second anti-reflective layer covering the concave rear surface of the first lens, and a hydrophobic coating covering the second anti-reflective layer such that the second anti-reflective layer is positioned between the concave rear surface of the lens and the hydrophobic coating. The first TCL and second TCL are electrically connected to one another in series.

BRIEF DESCRIPTION OF THE DRAWINGS

The foregoing summary, as well as the following detailed description of embodiments of the anti-condensation eyewear, also referred to as an eye protection device, will be better understood when read in conjunction with the appended drawings of exemplary embodiments. It should be understood, however, that the invention is not limited to the precise arrangements and instrumentalities shown. The cross-hatching illustrated on the surface of the lenses in each of the figures represents the portions of the lenses of the eye protection devices that are covered by transparent conductive layers (TCLs). Put another way, the cross-hatched areas represent TCLs throughout the figures and not a visible pattern.

In the drawings.

DETAILED DESCRIPTION

Figure 1A:
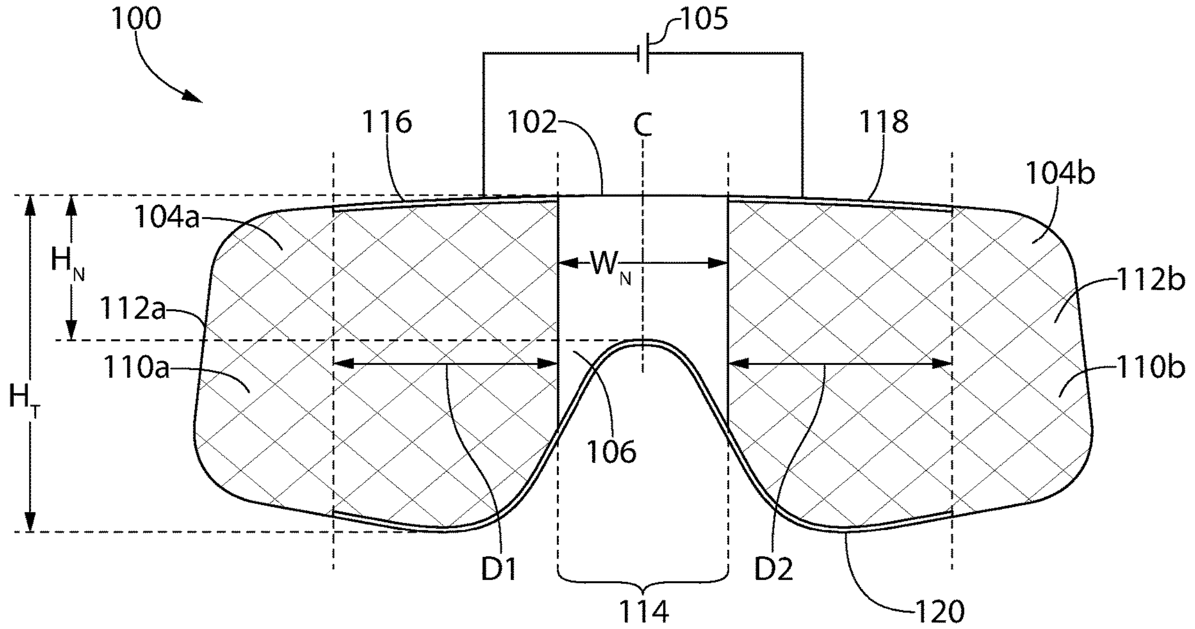
FIG. 1A is a schematic diagram illustrating an eye protection device in accordance with an exemplary embodiment of the present disclosure.

Eye protection devices including lenses and visors are used in a variety of applications to enhance vision and/or protect a user's eyes. For example, in various operating environments, partially, fully, or substantially sealed eye protection devices, face and/or respiratory systems are required for protection. In instances a fully sealed eye protection device may be required to protect the user from a hazardous operating environment. For example, in the case of a sealed goggle the inner lens surface may fog due to the lens surface temperature being lower than the dew point of the relative environment. As the user wears the sealed goggle the user's face and particularly the forehead may heat the air cavity through thermal radiation. During any physical exertion, this heating and humidity may be expedited, and the lens may rapidly fog due to the users elevated body temperature and perspiration causing the dew point to exceed the temperature of the lens as well as increasing moisture in the sealed environment from the user's face and forehead sweat. Such fogging and an increase in the moisture of the sealed environment may occur more quickly in relatively cold or hot and humid environments. This may progressively reduce the vision of the user potentially leading to lost situational awareness and sometimes completely obscured vision with possibly dangerous consequences On the interface between a surface of a solid lens included in the eye protection device and a gas-phase atmosphere containing moisture, fogging (e.g., condensation of micro water droplets) may occur based on the relative temperature difference between the surface temperature of the lens and the "dew point" temperature of the humid ambient air. The Dew point temperature, also called condensation temperature, is a relative measure of how much moisture is in the air. When the surface temperature of a lens is the same or lower than the dew point temperature, fogging/condensation on the lens may occur and vice versa. For example, raising the surface temperature of the lens may vaporize the condensation thereby removing the condensation on the surface of the lens. In order to prevent further condensation build up on the surface of the lens, it may be beneficial to maintain the surface temperature of the lens above the dew point temperature.

Conventional eye protection devices aimed at preventing and/or removing fogging on the surface of a lens include the use of micro-size fans to ventilate humid air in the cavity between the user's face and the sealed lens. However, this approach is often noisy and bulky as it includes multiple moving parts. Additionally, the noise generated by the fans may interfere with the user's verbal communication or limit stealth capabilities when used in a military application. Furthermore, the use of micro-size fans may introduce potentially contaminated air from the external environment into the sealed environment between the user's face and the sealed lens.

Referring to the drawings in detail, wherein like reference numerals indicate like elements throughout, there is shown in FIGS. 1A-1H an embodiment of an eye protection device, generally designated 100, in accordance with an exemplary embodiment of the present invention. In some embodiments, the eye protection device 100 includes one or more electrically powered heating elements configured to raise the temperature of a surface of a lens to remove and/or prevent buildup of condensation on said surface of the lens. For example, the eye protection device 100 may include one or more transparent conductive layers (TCL) configured to heat one or more portions of the lens. The eye protection device 100 may be configured to improve the conversion efficiency from electrical energy to heat generation as compared to conventional eye protection devices. In some embodiments, the eye protection device 100 is configured to evenly distribute heat locally and/or to regions of interest (ROI) on the surface of the lens.

In some embodiments, the eye protection device 100 is configured to reduce power consumption and/or improve the compatibility of the one or more electrically powered heating elements with conventional external power sources when compared to conventional eye protection devices. In some embodiments, the eye protection device 100 is configured to reduce optical loss and/or reduce glare caused by electrically powered heating elements included in conventional eye protection devices. In some embodiments, the eye protection device 100 is configured to provide greater scratch and/or smudge resistance with respect to the TCL than conventional eye protection devices. In some embodiments, the eye protection device 100 is configured to prevent buildup of excess moisture on a surface of the lens.

Figure 1B:
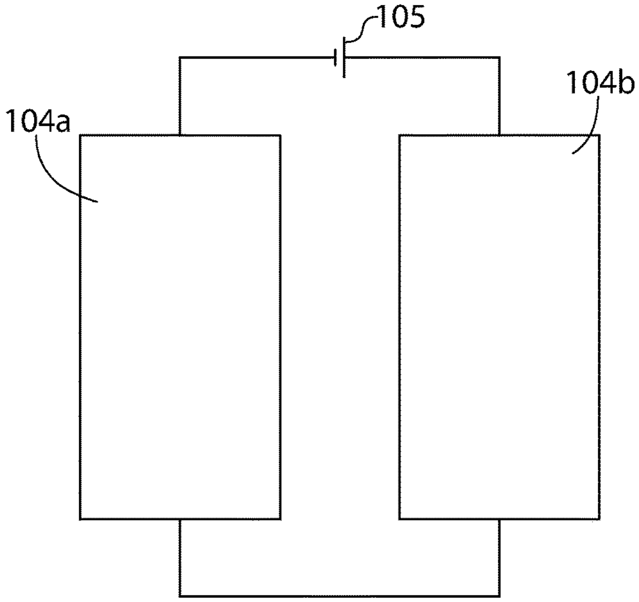
FIG. 1B is an electrical diagram illustrating the electrical connections of the eye protection device of FIG. 1A.
Figure 1C:
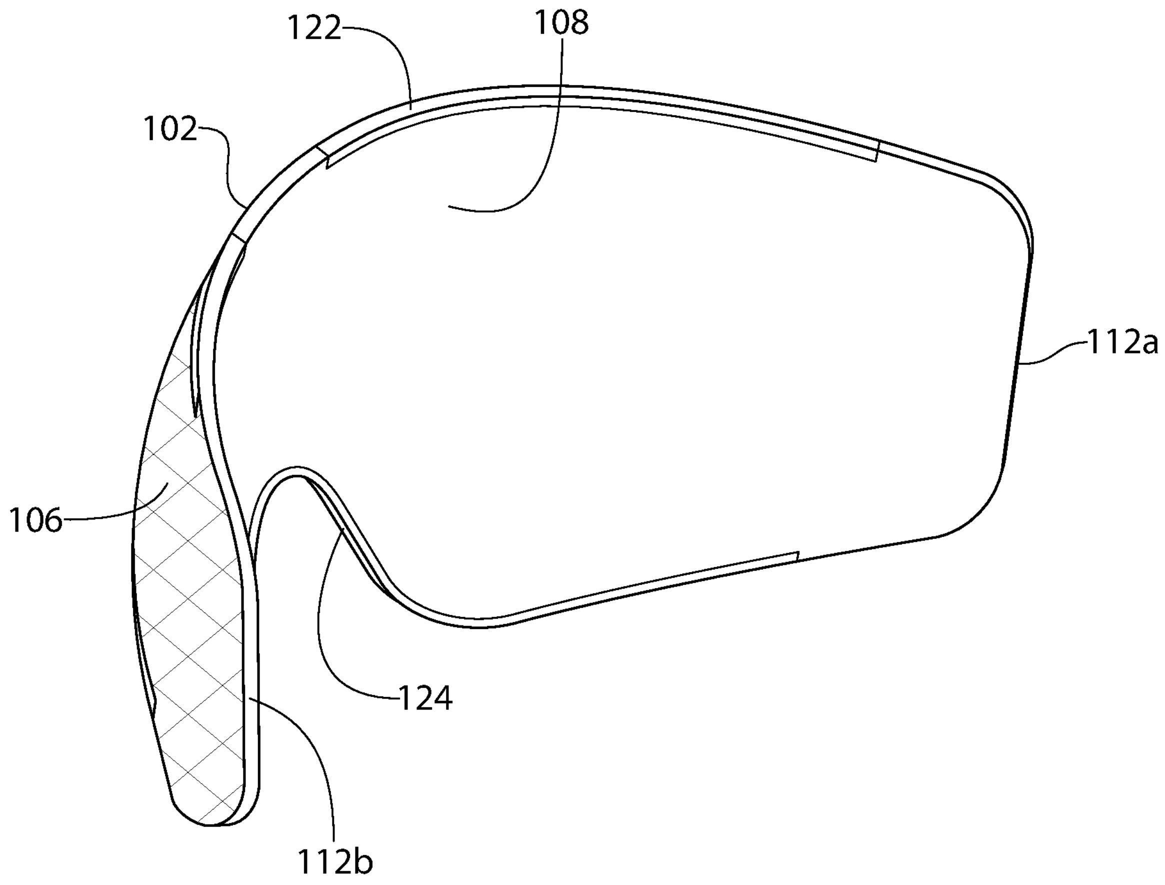
FIG. 1C is a rear perspective view of the lens of the eye protection device of FIG. 1A.

Referring to FIGS. 1A-1C, the eye protection device 100 may include a lens 102, a first TCL 104*a* and a second TCL 104*b* each configured to heat one or more portions of the lens 102. In some embodiments, the eye protection device 100 is a goggle. In other embodiments, the eye protection device 100 may be glasses, a visor, a mask (e.g., a gas mask), a face shield, or a fully enclosed head protection system. In some embodiments, the eye protection device 100 may be an eye and/or respiratory protection device that has constrained airflow in the space between the lens 102 and the user's face and/or skin. In some embodiments, the eye protection device 100 may be included in a sealed, partially sealed, or non-sealed face and/or head protection device. The lens 102 may have a front surface 106 and a rear surface 108 disposed opposite the front surface 106. In some embodiments, the front surface 106 may have a convex curvature and the rear surface 108 may have a concave curvature (as illustrated in FIG. 1C). The lens 102 may be sized to extend across a portion of a wearer's face. In some embodiments, the lens 102 is sized to extend across the wearer's eyes and at least a portion of their forehead. In some embodiments, the lens 102 is comprised of a transparent material (e.g., plastic, glass). In some embodiments, the lens 102 may be comprised of a rigid transparent material. In other embodiments, the lens 102 may be comprised of a transparent material that is at least partially flexible. In some embodiments, the lens 102 may be comprised of a polycarbonate material.

In some embodiments, the first TCL 104*a* and/or second TCL 104*b* may be comprised of a transparent conductive oxide such as, but not limited to, indium tin oxide (ITO) or aluminum doped zinc oxide (AZO). In other embodiments, the first TCL 104*a* and/or second TCL 104*b* may be comprised of a transparent conductive polymer such as, but not limited to, polythiophenes or poly(styrene sulfonate) doped poly(3,4-ethylenedioxythiophene) (PEDOT:PSS). In other embodiments, the first TCL 104*a* and/or second TCL 104*b* may include polymer composite coatings that incorporate conductive metal nano particles such as, but not limited to, silver or copper nano-wires and carbon-nanotube films. In other embodiments, the first TCL 104*a* and/or second TCL 104*b* may include transparent metal meshes and/or conductive grids. In some embodiments, the first TCL 104*a* and/or second TCL 104*b* are configured to act as a heating element as an electrical current passes through said TCL 104*a*, 104*b*. For example, the first TCL 104*a* and/or second TCL 104*b* may generate heat via resistive heating (e.g., Joule heating) by converting electrical energy (e.g., electrical current) into heat that may spread outwardly from the first and/or second TCL 104*a*, 104*b* in all directions. The heat generated by the first and/or second TCL 104*a*, 104*b* may be positively related to the amount of current flowing through each. As such, when an electrical current passes through the first and/or second TCL 104*a*, 104*b*, a surface temperature of the lens 102 may be raised higher than the dew point temperature to vaporize any condensation on the surface of the lens 102 and/or prevent any condensation from forming on the surface of the lens 102.

In some embodiments, the TCLs 104*a*, 104*b* are coupled to the lens 102 by applying a TCL layer to a surface of the lens 102 and removing portions of the TCL layer to form the separate first and second TCLs 104*a*, 104*b*. For example, in some embodiments, a TCL layer is applied to the surface of the lens 102 such that the entire surface is substantially covered by the TCL layer. A marking and/or removal process (e.g., laser etching, chemical etching) is performed to remove portions of the TCL layer such that an area of the lens 102 is devoid of any TCL. For example, laser or chemical etching may be performed on portions of the TCL layer that cover the nasal region 114 of the lens 102 such that those portions of the TCL layer are removed thereby forming the first and second TCLs 104*a*, 104*b* that are spaced from one another.

The first TCL 104*a* may be configured to cover a first heating area 110*a* on the lens 102 and the second TCL 104*b* may be configured to cover a second heating area 110*b* on the lens 102. The first heating area 110*a* and second heating area 110*b* may each be separate and distinct areas on the front surface 106 of the lens 102 where heating via the respective first and second TCL 104*a*, 104*b* is intended. For example, the first heating area 110*a* may be defined by a portion of the front surface 106 of the lens 102 extending from a first temporal edge 112*a* of the lens 102 toward a nasal region 114 of the lens 102. The nasal region 114 may be defined as the portion of the lens 102 configured to be proximate the user's nasal bridge and that is not covered by a TCL (e.g., TCLs 104*a*, 104*b*). In some embodiments, there is no TCL 104*a*, 104*b* that is located at the apex of the nasal region 114, which is positioned along the central axis C. The first temporal edge 112*a* of the lens 102 may be a portion of the lens 102 configured to be proximate a user's temple when the eye protection device 100 is worn by the user. Similarly, the second heating area **110*b* may be defined by a portion of the front surface 106 of the lens extending from a second temporal edge 112*a* of the lens 102 toward the nasal region 114. The second temporal edge 112*b* of the lens 102 may be a portion of the lens 102 configured to be proximate the user's other temple when the eye protection device 100 is worn by the user. The nasal region 114 of the lens 102 may be a portion of the lens 102 configured to align with a nasal bridge of the user when the eye protection device 100** is worn by the user.

In the embodiment illustrated in FIG. 1A, the first heating area **110*a* and second heating area 110*b* are substantially covered by the first and second TCLs 104*a*, 104*b* respectively. As such, the first heating area 110*a* may be defined by the area on the front surface 106 of the lens 102 that is covered by the first TCL 104*a*, and the second heating area 110*b* may be defined by the area on the front surface 106 of the lens 102 that is covered by the second TCL 104*b*. In some embodiments, the first TCL 104*a* and first heating area 110*a* are spaced from the second TCL 104*b* and second heating area 110*b*. Put another way, the first TCL 104*a* and first heating area 110*a* may not directly contact the second TCL 104*b* and second heating area 110*b*. As such, the space between the first TCL 104*a* and second TCL 104*b* may coincide with the nasal region 114 of the lens 102. Put another way, the nasal region 114 of the lens 102** may be free of any TCL.

In some embodiments, the first TCL **104*a* may be configured to cover portions of the lens 102 corresponding to the user's right or left eye and the second TCL 104*b* may be configured to cover portions corresponding to the user's other eye. For example, the first TCL 104*a* may be applied to a right eye region of the lens 102 that, when the eye protection device 100 is worn by the user, is positioned directly in front of the user's right eye. Similarly, the second TCL 104*b* may be applied to a left eye region of the lens 102. In some embodiments, the left and right eye regions of the lens 102 include only a single TCL. In some embodiments, the first TCL 104*a* may be a continuous layer applied to and substantially covering the right or left eye region of the lens 102 and the second TCL 104*b* may be a continuous layer applied to and substantially covering the remaining eye region of the lens 102**.

The first TCL **104*a* and the second TCL 104*b* may be coupled to the front surface 106 of the lens 102 such that the first TCL 104*a* and second TCL 104*b*, when powered, may heat the front surface 106 of the lens 102. For example, there may be a power supply 105 electrically connected to the first TCL 104*a* and the second TCL 104*b* and configured to transmit power to each. The power supply 105 may be a battery, a detachable battery pack, or any other power source that is configured to transmit an electrical current to the first TCL 104*a* and the second TCL 104*b*. As discussed above, each of the TCLs 104*a*, 104*b*** may be configured to generate resistive heat energy governed by Joule's first law: $Q=I^2*R*t$, where I is the current, R is the bulk resistance from a respective TCL **104*a*, 104*b* between two opposing electrodes, t is the current flow time, and Q is the heat. The bulk resistance R is positively related to the distance between the two opposing electrodes (e.g., opposing bus bars discussed in more detail below) to which the TCL 104*a*, 104*b* is electrically connected, and inversely related to the length of the electrode extending along a portion of the TCL 104*a*, 104*b***. For example, a TCL having a distance d between opposing electrodes and a width w have a bulk resistance R as determined by: $R=A*d/w$, where A is the TCL sheet resistance in Ohm/sq in.

The eye protection device 100 may include one or more bus bars (e.g., electrode buses) configured to electrically connect to one or more of the first TCL **104*a* and second TCL 104*b*. In some embodiments, the eye protection device 100 includes a first bus bar 116, a second bus bar 118, and a third bus bar 120 each of which being electrically connected to at least one of the first TCL 104*a* and second TCL 104*b*. In some embodiments, each of the bus bars 116, 118, 120 includes an electrically conductive material such that an electrical connection between the power supply 105 and the first and second TCL 104*a*, 104*b* may be formed. For example, each bus bar 116, 118, 120 may be a strip of conductive material (e.g., copper or silver) enclosed within a housing and configured to distribute electrical current to and from the power supply 105**.

In some embodiments, the first bus bar 116 extends along a portion of the periphery of the lens 102 and electrically connected to the first TCL **104*a*. For example, the first bus bar 116 may be coupled to the lens 102 along or proximate the periphery at a top surface 122 of the lens 102. In some embodiments, the first bus bar 116 extends along, or proximate, the top surface 122 of the lens 102 by a distance $D_1$ that is generally equal to or less than a width of the first heating area 110*a*. For example, the distance $D_1$ illustrated in FIG. 1A is less than the total width of the first heating area 110*a* which extends from an outer edge of the nasal region 114 to the first temporal edge 112*a* of the lens 102. In some embodiments, the height $H_N$ of the nasal region 114 as measured from the apex located at the bottom edge of the lens 102 to the top edge of the lens 102 along the central axis C is less than the height $H_T$ of the left and right eye regions of the lens 102. The height $H_T$ of the left and right eye regions of the lens 102 may represent the maximum height of the lens 102**. In some embodiments, the height $H_N$ is about half of the height $H_T$. In some embodiments, the height $H_T$ may be between about 1.00 inches to about 5.00 inches. In some embodiments, the height $H_T$ is about 2.50 inches. In some embodiments, the height $H_N$ may be between about 0.50 inches to about 3.00 inches. In some embodiments, the height $H_N$ is about 1.00 inches.

In some embodiments, the second bus bar 118 extends along another portion of the periphery of the lens 102 and is electrically connected to the second TCL **104*b*. For example, the second bus bar 118 may be coupled to the lens 102 along or proximate the periphery at the top surface 122 of the lens 102. In some embodiments, the second bus bar 116 extends along, or proximate, the top surface 122 of the lens 102 by a distance $D_2$ that is generally equal to or less than a width of the second heating area 110*b*. For example, the distance $D_2$ illustrated in FIG. 1A is less than the total width of the second heating area 110*a*, which extends from an outer edge of the nasal region 114 to the second temporal edge 112*b* of the lens 102. In some embodiments, the distance $D_2$ is generally equal to the distance $D_1$. In some embodiments, the second bus bar 118 is spaced from the first bus bar 116 such that they do not directly contact one another. For example, the first bus bar 116 and second bus bar 118 are spaced from one another by a distance generally equal to the width of the nasal region 114**.

In some embodiments, the third bus bar 120 extends along another portion of the periphery of the lens 102 opposite the first and second bus bars 116, 118 and is electrically connected to at least one of the first TCL **104*a* and second TCL 104*b*. In some embodiments, the third bus bar 120 is electrically connected to both the first TCL 104*a* and second TCL 104***b* thereby forming an electrical connection between the first TCL 104*a* and second TCL 104*b*. The third bus bar 120 may be coupled to the lens 102 along or proximate the periphery at a bottom surface 124 of the lens 102. The third bus bar 120 may extend, along the bottom surface 124 of the lens 102, from the first TCL 104*a* and first heating area 110*a*, across the nasal region 114, and to the second TCL 104*b* and second heating area 110*b*. In some embodiments, the third bus bar 120 extends along the bottom surface 124 of the lens by a distance generally equal or greater than the distance $D_1$ plus distance $D_2$ plus the width $W_N$ of the nasal region 114. The width $W_N$ of the nasal region 114 may be between about 0.0025 inches to about 2.00 inches. In some embodiments, the width $W_N$ of the nasal region 114 may correspond to the distance between the first and second TCL 104*a*, 104*b*. In some embodiments, the first bus bar 116, second bus bar 118, and third bus bar 120 do not directly contact one another. In some embodiments, the bus bars 116, 118, and 120 do not extend entirely around the periphery of the lens. For example, none of the bus bars 116, 118, and 120 extend around the portions of the periphery along the first and second temporal edges 112*a*, 112*b*.

Figure 1D:
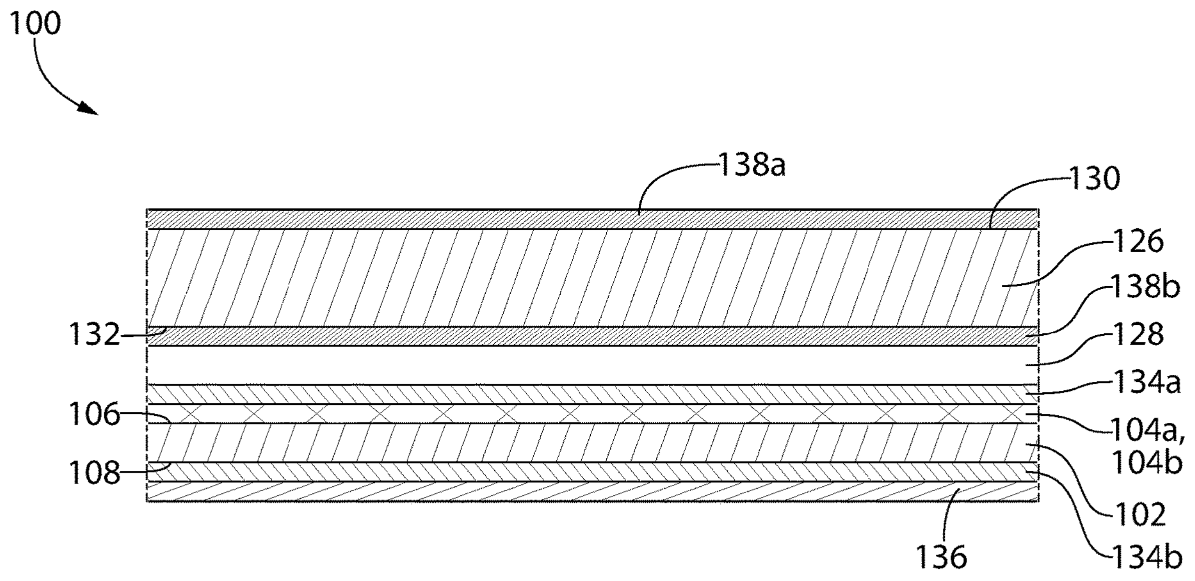
FIG. 1D is a side elevational cross-sectional view of the lenses included in the eye protection device of FIG. 1A.
Figure 1E:
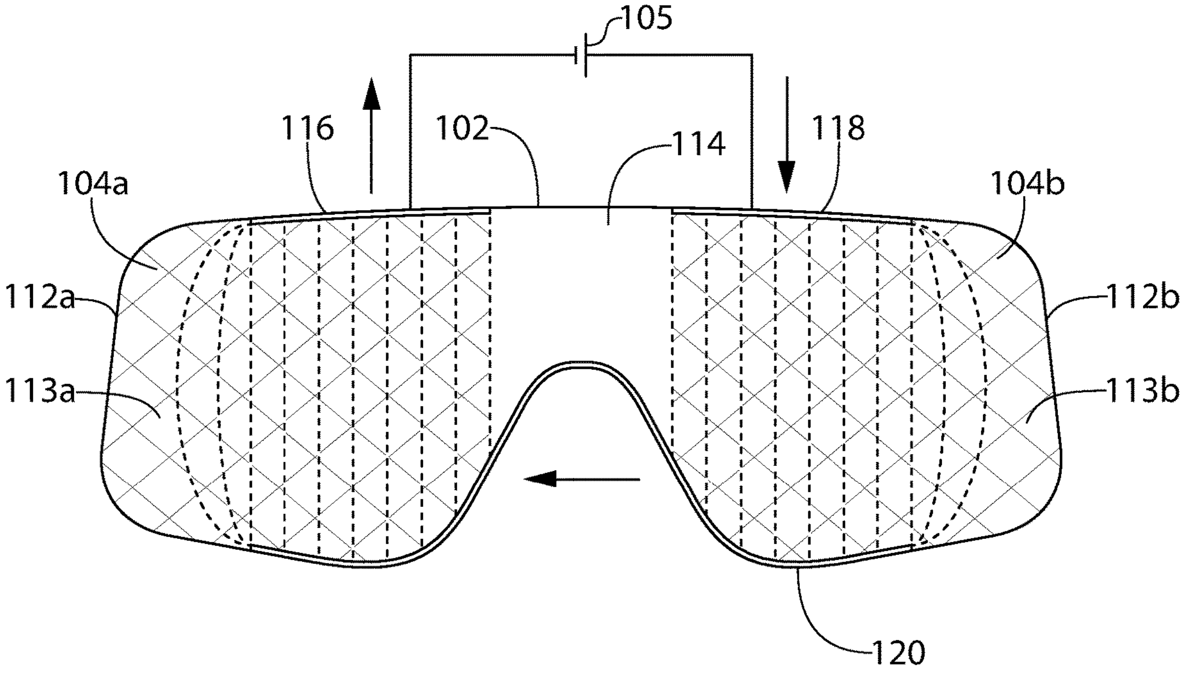
FIG. 1E is a schematic diagram of the eye protection device of FIG. 1A illustrating electrical pathways.

Referring to FIGS. 1B and 1E, in some embodiments, the first TCL 104*a* and the second TCL 104*b* are electrically connected in series. For example, FIG. 1B is an equivalent electrical diagram illustrating the electrical connection of the first TCL 104*a* to the second TCL 104*b* to the power supply 105. As shown, current may flow from the power supply 105 to the second TCL 104*b* and from the second TCL 104*b* to the first TCL 104*a* in series. By providing TCLs 104*a*, 104*b* connected in series, the runtime of the power supply 105 may be improved when compared to conventional anti-condensation systems including TCLs. For example, a power supply 105 configured to output a set voltage when powering a device with a low resistance results in a high current flow. A high current flow may negatively impact the longevity of the power supply 105. As such, by providing TCLs 104*a*, 104*b* connected in series, the resistance of the eye protection device 100 is increased thereby lowering the current flow and improving the longevity of the power supply 105 including after a plurality of charge and discharge cycles. In some embodiments, the bulk resistance of the first and second TCLs 104*a*, 104*b* may be determined based on a desired heat output and power supply 105 runtime. For example, because the TCLs 104*a*, 104*b* are connected in series, the total resistance across the TCLs 104*a*, 104*b* is increased when compared to a parallel connection thereby improving power supply 105 runtime and decreasing heat output. Heat output may be decreased resulting from the decrease in current flow, which results from the increased resistance. As such, the bulk resistance may be determined such that the heat generation of the TCLs 104*a*, 104*b* is balanced with a desired power supply 105 runtime and/or longevity.

In some embodiments, current may flow from the power supply 105 to the second bus bar 118, from the second bus bar 118 across the second TCL 104*b*, from the second TCL 104*b* to the third bus bar 120, from the third bus bar 120 to across the first TCL 104*a*, from the first TCL 104*a* to the first bus bar 116 and from the first bus bar 116 to an electrical ground. The direction of current flow is illustrated in FIG. 1E where the directional lines exterior to the lens 102 illustrate the general direction of current flow and the broken lines on the surface of the lens 102 illustrate the direction of the electrical current (e.g., the electrical current path) as it flows across the first and second TCLs 104*a*, 104*b* respectively. It will be understood however, that the current may flow to the first TCL 104*a* and then to the second TCL 104*b* if the first TCL 104*a* is connected to the positive polarity of the power supply 105. The direction of current flow may not impact the heating of first TCL 104*a* and/or the second TCL 104*b*.

As shown in FIG. 1E, the broken lines indicating the electrical current path illustrate that the electrical current passes between opposing bus bars (e.g., the second bus bar 118 and third bus bar 120, the third bus bar 120 and first bus bar 116). However, as mentioned above, none of the bus bars 116, 118, 120 extend along the portions of the periphery of the lens 102 proximate the temporal edges 112*a* and 112*b*. As such, and as illustrated by the broken lines, the electrical current may travel along a curved pathway between the ends of the bus bars 116, 118, 120 that terminate proximate the temporal edges 112*a*, 112*b* of the lens 102. As such, each of the first TCL 104*a* and second TCL 104*b* may include a heat generation area defined by the portions of the first and second TCLs 104*a*, 104*b* that are along and between the electrical current pathways. Furthermore, each of the first TCL 104*a* and second TCL 104*b* may include a heat conduction area defined by the portions of the first and second TCLs 104*a*, 104*b* that are exterior to the electrical current pathways. The heat conduction areas may include, for example, a temporal regions 113*a*, 113*b* of the lens 102, which, in FIG. 1E, extend from the outer most curved broken line indicating electrical current path to a respective temporal edge 112*a*, 112*b* of the lens 102. In some embodiments, the heat conduction area may be defined as the portion of the first and second TCLs where limited to no electrical current flows.

In some embodiments, by providing the heat conduction area in each of the first TCL 104*a* and second TCL 104*b*, heat generated from the heat generating areas of the first and second TCLs 104*a*, 104*b*, respectively, may be conducted to temporal regions of the lens 102 thereby removing and/or preventing condensation build up on those regions of the lens 102. In some embodiments, by providing the heat conduction area in each of the first TCL 104*a* and second TCL 104*b*, the heat distribution along the lens 102 may be more uniform than when compared to conventional anti-condensation devices and systems for eyewear. For example, in conventional anti-condensation systems, the full area of the lens is covered by a TCL and any bus bars may extend around substantially all of the periphery of the lens. Because the nasal region and temporal regions are narrower (e.g., lower height) the local bulk resistance of the TCL in that area is lower, which results in the electrical current being higher and thus generating more heat. However, by providing bus bars 116, 118, and 120 and first and second TCLs 104*a*, 104*b*, configured to contain the electrical current pathways, the conversion efficiency from electrical energy to heat may be improved, overheating in the nasal region 114 and temporal regions 113*a*, 113*b* may be prevented, and overall heat energy usage may be decreased (e.g., less power consumption) when compared to conventional systems and devices.

In some embodiments, the position and length of each of the bus bars 116, 118, 120 is dependent upon a desired bulk resistance of the first and second TCL 104*a*, 104*b*. For example, the amount of electrical current traveling between the second and third bus bars 118, 120 and the third and first bus bars 120, 116 is dependent upon the bulk resistance of the first and second TCLs 104*a*, 104*b* respectively. As discussed above, the bulk resistance of the first and second TCLs 104*a*, 104*b* is dependent upon the height of the TCLs 104*a*, 104*b* between the top and bottom surfaces 122, 124 of the lens 102. As such, the bus bars 116, 118, 120 may be positioned relative to and extend along portions of the first and second TCLs 104*a*, 104*b* where the bulk resistance of the TCLs 104*a*, 104*b* is more uniform. As such, the conversion efficiency of electrical current to heat may be improved. In some embodiments, by providing bus bars 116, 118, 120 having a length and position determined by the bulk resistance of the TCLs 104*a*, 104*b*, the eye protection device 100 may include power supplies of varying voltages. For example, bus bar 116, 118, 120 length and/or position may be altered such that the bulk resistance between opposing bus bars 116, 118, 120 is altered for a given constant sheet resistance of the respective TCL 104*a*, 104*b* thereby allowing for improved matching to power supply voltage and/or amp-hours (AH) to increase runtime on a single charge of the power supply.

Put another way, the position and/or length of each of the bus bars 116, 118, 120 may be determined based on portions of the lens where the distance between the top and bottom surfaces 122, 124 is generally equal. For example, the bus bars 116, 118, 120 may be positioned such that the current paths from opposing ends of the first and second bus bars 116, 118 and the corresponding ends and/or locations of the third bus bar 120 are generally equal resulting in generally equal current paths. Generally equal current path may refer to the distance of the current paths being generally equal. In some embodiments, generally equal current paths results in generally uniform heating, via the first and second TCLs 104*a*, 104*b*, of the lens 102. In some embodiments, generally uniform heating may reduce or eliminate hot spots on a surface of the lens 102 where significantly more heat is generated, thereby improving energy consumption efficiency and allowing for a power supply 105 of lower voltages and/or amp-hours to be used in the eye protection device 100 when compared to conventional devices and systems.

Referring to FIGS. 1A and 1C, in some embodiments, the first TCL 104*a* and second TCL 104*b* are mirror images of one another across a center line C of the lens 102. Put another way, the shape, size, position and orientation of the first TCL 104*a*, and second TCL 104*b* may be symmetrical about the center line C of the lens 102. By providing symmetrical TCLs 104*a*, 104*b*, heat generated and dispersed along opposing sides of the lens (e.g., right and left) may be generally evenly distributed. For example, by providing symmetrical TCLs 104*a*, 104*b*, the bulk resistance of current flowing between opposing bus bars 118 and 120 and opposing bus bars 120 and 116 may be generally the same thereby causing the TCLs 104*a*, 104*b* to generate generally equal amounts of heat. Put another way, the bulk electrical resistance of the first TCL 104*a* and second TCL 104*b* may be substantially equal. Uniform heat distribution may further improve and/or positively impact the overall energy efficiency of the eye protection device 100.

Referring to FIGS. 1A and 1D, the eye protection device 100 may include one or more additional lenses and/or layers configured to improve thermal efficiency of the eye protection device 100. In some embodiments, the eye protection device 100 may include another lens 126, also referred to as second lens 126 or outer lens 126, that is spaced from lens 102, also referred to as first lens 102 or inner lens 102. For example, the second lens 126 may be spaced from the first lens 102 such that a gap 128 is formed between the first lens 102 and the second lens 126. In some embodiments, the gap 128 may act as a heat insulation layer and may be a vacuum or be filled with air, argon, or another gas. In some embodiments, the second lens 126 has a front surface 130 and a rear surface 132. The front surface 130 may have a convex curvature and the rear surface 132 may have a concave curvature similar to the curvatures of the front and rear surfaces 106, 108 of the first lens 102 illustrated in FIG. 1C. In some embodiments, the lens 102 may be the only lens included in the eye protection device 100 and the first and second TCLs 104*a*, 104*b* may be directly coupled to the concave rear surface 108 of the lens 102.

In some embodiments, the first and second TCLs 104*a*, 104*b* may be positioned between the gap 128 and the first lens 102. By providing a gap 128 between the first lens 102 and second lens 126, may insulate the heat energy generated by the TCLs 104*a*, 104*b* thereby improving the efficiency of the conversion from electrical power to heat and/or reduce the overall power usage required to maintain heat generation sufficient to remove and/or prevent condensation build up on the lens 102. In some embodiments, by positioning the first and second TCLs 104*a*, 104*b* between the first lens 102 and second lens 126, the first and second TCLs 104*a*, 104*b* may not be directly exposed to the external environment thereby protecting the TCLs 104*a*, 104*b* from being scratched or damaged and preventing, or at least reducing the risk of excess moisture buildup on the front surface 106 of the lens 102. In some embodiments, variable light transmittance (VLT) functionality may be included in the eye protection device 100. For example, one or more of the first lens 102 and/or second lens 126 may be configured to transition from opaque to transparent and vice versa, in the presence of heat. In such embodiments, the second lens 126 and/or the gap 128 formed by the position of the second lens 126 relative to the first lens 102 may improve the VLT from opaque to transparent and vice versa in low temperature environments by allowing for rapid transitions between opaque and transparent. The VLT may include photochromic, electrochromic, and liquid crystal technologies.

In some embodiments, there may be one or more anti-reflective (AR) layers or coatings applied on one or more surfaces of the lens 102, second lens 126, and/or the TCLs 104*a*, 104*b*. In some embodiments, there is a first AR layer 134*a* covering the first TCL 104*a*, and second TCL 104*b*. In some embodiments, the first AR layer 134*a* and TCLs 104*a*, 104*b* may be integrally formed, or, put another way, the first AR layer 134*a* may include the material(s) that comprise the TCL in combination with one or more other materials. In some embodiments, the first AR layer 134*a* covers the portions of the front surface 106 of the lens 102 that are not covered by the TCLs 104*a*, 104*b*. For example, the first AR layer 134*a* may cover each of the first and second TCLs 104*a*, 104*b* and extend between them covering the nasal region 114 at the front surface 106 of the lens 102. In some embodiments, the first AR layer 134*a* is coated onto the first and second TCLs 104*a*, 104*b* using vacuum deposition.

By applying the first AR layer 134*a* to the first and second TCLs, issues with loss of visibility on the surface of the lens 102 where the TCLs 104*a*, 104*b* are positioned may be reduced, there may be reductions in glare, and/or the TCLs 104*a*, 104*b* may be more resistant to scratches and/or smudges. For example, the refractive index of the ITO (~1.8-2.05), a material which the TCLs 104*a*, 104*b* may be comprised of, is much higher than that of the air (1.0), thus there may be considerable optical loss on the interface between an ITO TCL and air. Such an optical loss may not only reduce the transmittance and thus lowers the user's visibility, but also may cause glare and/or result in a double image problem when coupled with a second lens 126. Therefore, by providing the first AR layer 134*a* on top of the first and second TCL 104*a*, 104*b*, in which the TCL 104*a*,

104*b* layer serves as one of the layers in the antireflection stack, the eye protection device 100 may be configured to significantly reduce optical loss, and may also reduce the interference between the TCLs 104, 104*b* and the rear surface 130 of the second lens 126.

In some embodiments, there may be a second AR layer 134*b* coupled to the rear surface 108 of the lens 102. The second AR layer 134*b* may substantially cover the rear surface 108 of the lens 102. The second AR layer 134*b* may further improve the visibility when the eye protection device 100 is in use by a user. For example, the lens 102 may be comprised of, a polyethylene terephthalate (PET) or polycarbonate (PC), which typically has a higher refractive index than that of air leading to optical loss in the interface between the lens 102 and air. In instances where a PET lens alone faces towards to the user's eyes, it may also cause a glare, particularly at night, highlighting beams from oncoming vehicles. In some embodiments, the second AR layer 134*b* is coated on the rear concave surface 108 of the lens 102, which may not only reduce the optical loss, but may also reduce glare experienced by the user. In some embodiments, there may be an AR layer generally the same as the first AR layer 134*a* and/or second AR layer 134*b* coated on the front and/or rear surfaces 130, 132 of the second lens 126 to improve visible light transmission of the eye protection device 100.

In some embodiments, there may be a hydrophobic coating 136 applied to the lens 102 and configured to prevent buildup of condensation resulting from sweat generated by the user. For example, the hydrophobic coating 136 may be interior to the rear surface 108 of the lens 102 such that the hydrophobic coating is positioned between the user's face and the lens 102 when the eye protection device 100 is worn by the user. In some embodiments, the hydrophobic coating 136 is applied to the second AR layer 134*b* such that the second AR layer 134*b* is positioned between the hydrophobic coating 136 and the rear surface 108 of the lens 102. With the prolonged use of the eye protection device 100 in a sealed configuration (e.g., a sealed goggle) a substantial amount of sweat may be collected inside the cavity between the user's face and lens 102.

In instances where the eye protection device 100 is in a sealed configuration due to use in hazardous environments, the user may not be able to safely break the seal (e.g., remove the eye protection device 100) in order to expel the buildup of sweat. As such, the hydrophobic coating 136 may be configured to prevent the possibility of water droplets sticking to the rear surface 108 of the lens 102 upon which the hydrophobic coating 136 is coupled. As such, a benefit of the hydrophobic coating 136 may be that larger water droplets that are difficult to vaporize may fall off the lens while any small water residue/droplets remaining may be vaporized. As such, the need to increase energy output to vaporize larger water droplets may be prevented or at least reduced, thereby extend the run time of the power supply 105.

In some embodiments, there may be a first reinforced coating 138*a* and a second reinforced coating 138*b* applied to the second lens 126 on the front and rear surfaces 130, 132 respectively. The reinforced coatings 138*a*, 138*b* may alternatively be referred to as hardcoats 138*a*, 138*b*. In some embodiments, the first reinforced coating 138*a* and/or second reinforced coating 138*b* are configured to increase the durability and/or longevity of the second lens 126. For example, the first and/or second reinforced coatings 138*a*, 138*b* may increase the abrasion resistance of the second lens 126.

In some embodiments, the eye protection device 100 may be configured to protect a user's eyes from laser lights. For example, the eye protection device may include one or more laser light reflective coatings applied to a surface of the lens 102 and/or the second lens 126. In some embodiments, the eye protection device 100 includes laser absorptive dyes which may be incorporated in one or more additional layers applied to the first and/or second lens 102, 126 respectively or incorporated directly into a polymer that comprises the first and/or second lens 102, 126. In some embodiments, the laser light reflective coatings and/or laser absorptive dyes are included in only the second lens 126. In some embodiments, the eye protection device 100 may include any combination of reflective and absorptive laser eye protection systems and/or devices. In some embodiments, a laser light reflective coating may be applied to the front and/or rear surface 130 of the second lens 126 between the lens 126 and the respective protective coatings 138*a*, 138*b* (shown in FIG. 1D). In other embodiments, a laser light reflective coating may be applied to at least one of the protective coatings 138*a*, 138*b* such that at least one of the protective coatings 138*a*, 138*b* is positioned between the laser light reflective coating and the second lens 126. In other embodiments, the protective coatings 138*a*, 138*b* may include laser light reflective capabilities (e.g., laser absorptive dyes) incorporated therein.

In some embodiments, the eye protection device 100 may be configured to provide the user with ballistic impact attenuation and/or protection. For example, in the eye protection device 100 the second lens 126 is a ballistic protection device configured to protect the user's eyes from ballistic projectiles. In some embodiments, one or more of the lens 102 and the second lens 126 may be comprised of a transparent ballistic grade material configured to not shatter or break upon impact from a ballistic projectile. In some embodiments, the lens 102 may be comprised of a transparent ballistic grade material.

Figure 1F:
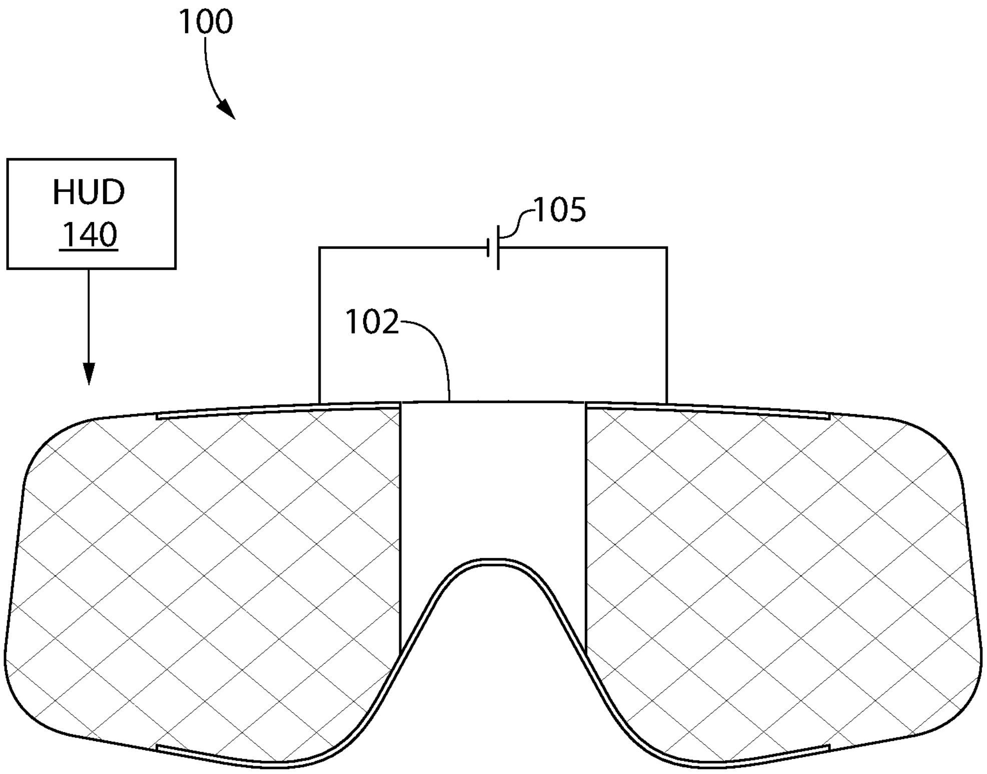
FIG. 1F is a schematic diagram of the eye protection device of FIG. 1A having a display device coupled thereto.

Referring to FIG. 1F, in some embodiments, the eye protection device 100 may include a display device 140 configured to generate and/or project an image that is visible to the user either through the lens 102, reflected off lens 102 to the user's eye, or directly from a wave guide system residing between the user's eye and lens 102. In some embodiments, the display device may be contained within a second lens 126. In some embodiments, the display device 140 may be a heads-up display (HUD). In some embodiments, the display device 140 may be electrically connected to power supply 105 such that the display device 140 may receive power from the power supply 105. In other embodiments, the display device 140 may receive power from a power supply other than power supply 105.

Figure 1G:
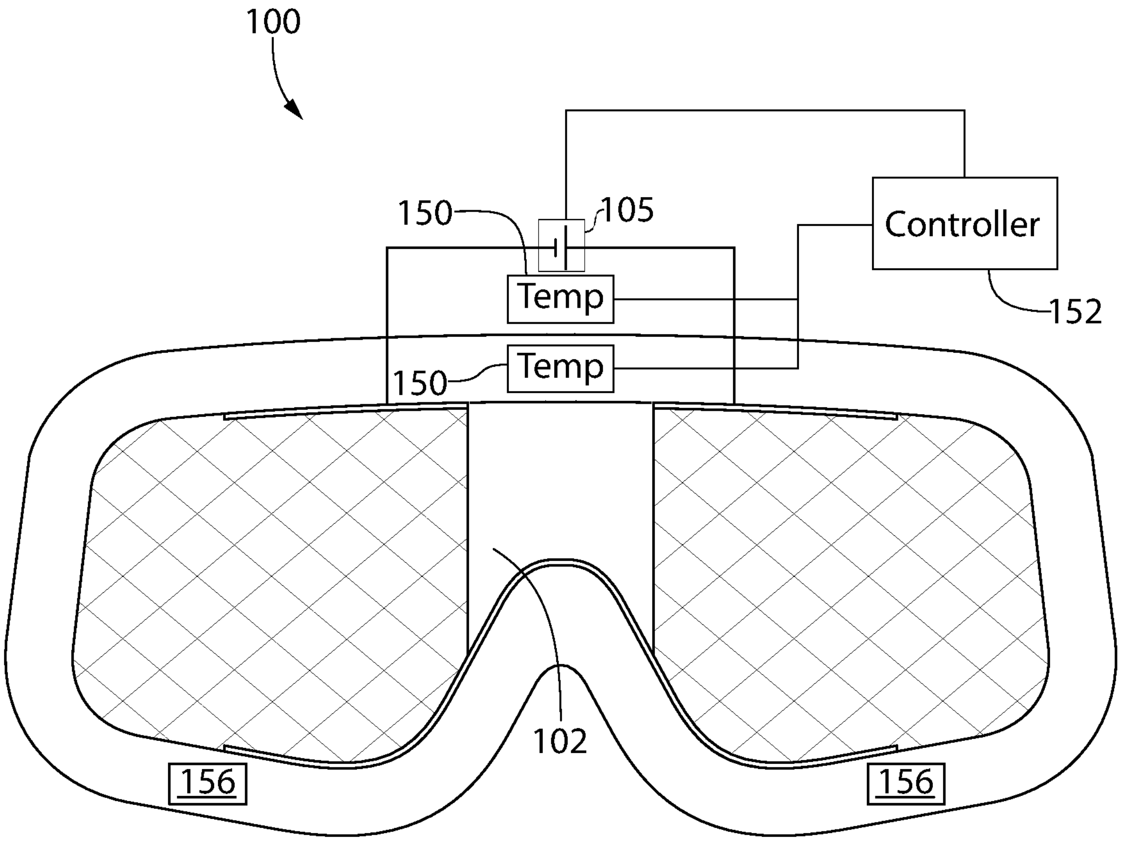
FIG. 1G is a schematic diagram of the eye protection device of FIG. 1A having a frame, temperature sensors and a controller coupled thereto.

Referring to FIG. 1G, in some embodiments, one or more temperature sensors 150 may be included in the eye protection device 100 to increase power usage efficiency. For example, one or more temperature sensors 150 may be mounted to the interior and/or exterior of the eye protection device 100 (e.g., when used as a sealed goggle or sealed eye protection device 100), to monitor the temperatures interior to and exterior to the sealed eye protection 100. In some embodiments a controller 152 (e.g., application-specific integrated circuit) may be included in the eye protection device 100 and in communication with the one or more temperature sensors 150. In this manner, temperature measurements may be obtained by the temperature sensors 150 and transmitted to the controller 152 such that the controller 152 may determine upper and lower limit temperature settings, to maximize the operation efficiency and prolong the power supply 105 runtime. For example, the controller 152 may be in communication with the power supply 105 such that the controller 152 may control the power output of the power supply 105. This may be especially beneficial as the eye protection device 100 may be portable and rely on a portable power supply 105. In some embodiments, the controller 152 may include simple logic circuitry or a circuitry using a micro-processor that is configured to actively adjust the power supplied to the first and second TCL 104*a*, 104*b* heating to maintain a desired surface temperature of the lens 102 (e.g., a temperature above the dew point temperature).

In some embodiments, the controller 152 may be a "thermostat" circuit. In such embodiments, a temperature setpoint may be determined and the controller 152 may selectively provide power from the power supply 105 to the TCLs 104*a*, 104*b*, or put another way, may turn the power supply on and off, to provide available voltage to the TCLs 104*a*, 104*b* in order to maintain the surface temperature of the lens 102 near the temperature setpoint. In some embodiments, one or more of the temperature sensors 150 may be a thermistor that may be used to measure the surface temperature of the lens 102. The placement of the thermistor relative to the lens 102 may be determined based on a location on the lens 102 that closely matches the surface temperature at the eye location of the lens 102. For example, because the lens 102 may have an irregular shape there may be one or more "hot spots" or locations along the surface of the lens 102 prone to high temperatures. Determining placement of the thermistor may include avoiding placing the thermistor at a hotspot because a majority of the lens may not maintain temperatures as high as the temperatures experienced at the hot spot.

Figure 1H:
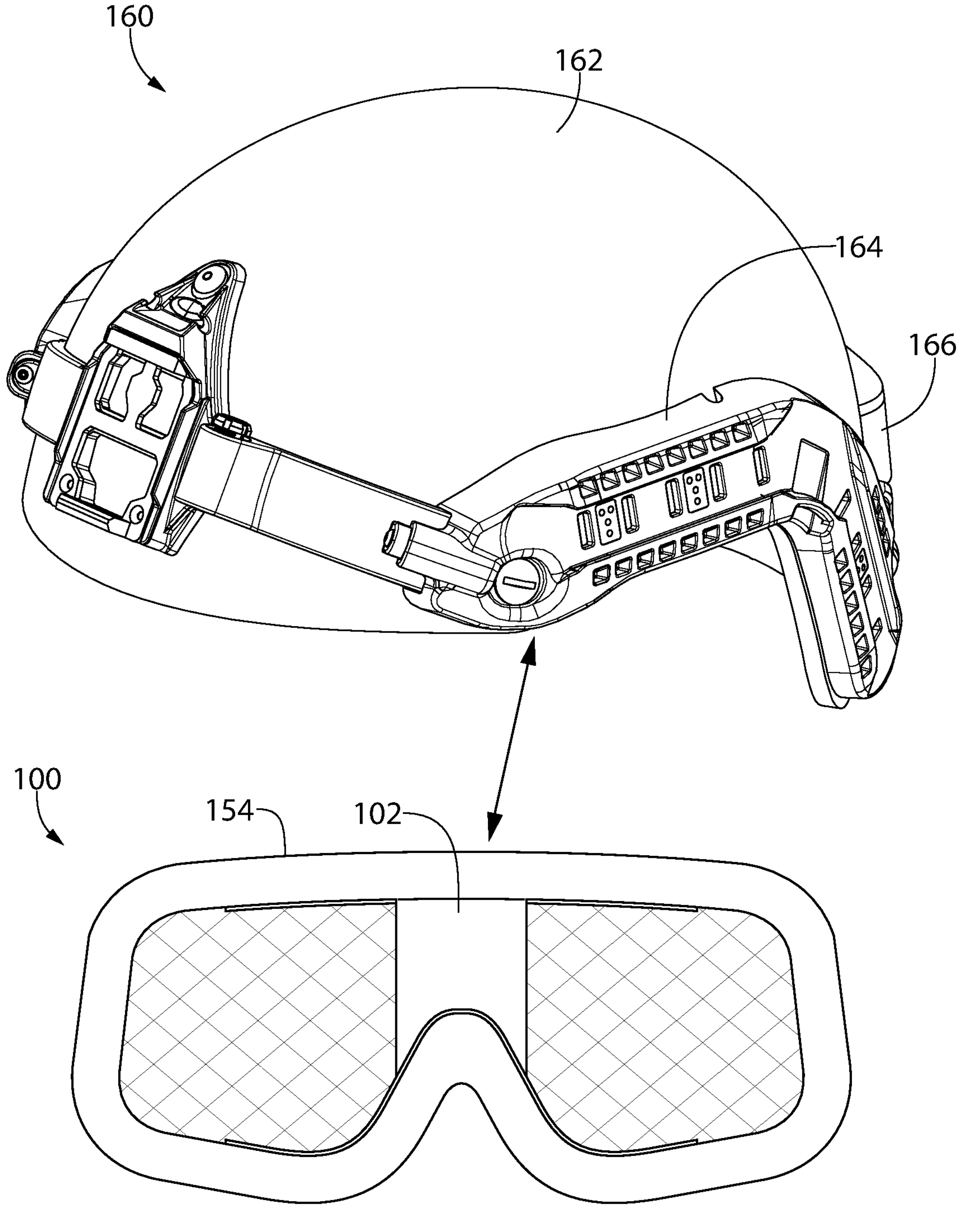
FIG. 1H is a schematic diagram of the eye protection device of FIG. 1A coupled to a powered helmet rail device.

Referring to FIGS. 1G-1H, in some embodiments, there may be a frame 154 coupled to the lens 102 and/or the second lens 126. For example, the frame 154 may couple the lens 102 and the second lens 126 together. In other embodiments, an adhesive spacer material may couple the lens 102 to the second lens 126 such that each of the lenses 102 and 126 may be coupled to the frame 154. The frame 154 may be a structure configured to at least partially surround the lens 102 and/or second lens 126 and provide one or more mounting locations configured to receive one or more straps or fastening means configured to secure the eye protection device 100 to the user's head. For example, the frame 154 may allow a series of straps to be coupled to the eye protection device 100 such that the eye protection device 100 may be coupled to the user's head. In some embodiments, the power supply 105 may be coupled to the frame 154. In some embodiments, the temperature sensors 150 may be coupled to the frame 154. In some embodiments, at least one of the temperature sensors 150 is coupled to an exterior surface of the frame 154. One or more of the temperature sensors 150 may be coupled to an inner surface of the frame 154.

In other embodiments, the eye protection device 100 is electrically connected to a powered helmet rail device 160 configured to provide power to the eye protection device 100. For example, there may be a helmet 162 (e.g., a ballistic helmet) having one or more electrically powered rails 164 coupled thereto. The eye protection device 100 may be electrically coupled to the powered helmet rail 164 such that the rail 164 may provide power to the first and second TCLs 104*a*, 104*b*. In such embodiments, the controller 152 may be included in the helmet rail device 160 and/or in communication with a power supply 166 included in the helmet rail device 160.

In some embodiments, especially those applications where the eye protection device 100 is fully or partially sealed around the face, one or more liquid absorption structures and/or materials, generally referred to as liquid absorption material 156, may be included in the eye protection device 100. For example, the liquid absorption material 156 may be a sponge like material coupled to the eye protection device 100 and configured to absorb the accumulated condensate. For example, a liquid absorption material 156 may be coupled to the frame 154 interior to and/or below the lens 102 such that liquid on the inner surface of the lens 102 may collect at the bottom of the frame 154 and be absorbed by the liquid absorption material 156. In other embodiments, permanent, regeneratable or disposable desiccant materials may be positioned within an interior region defined by the space between the eye protection device 100 and the user's face. In such embodiments, these materials may absorb liquid water as well as reduce the humidity of the interior region. Some examples of these desiccant materials may include, but are not limited to, as silica gels, clays, zeolites, metal organic frameworks, and hydrogels.

Figure 2:
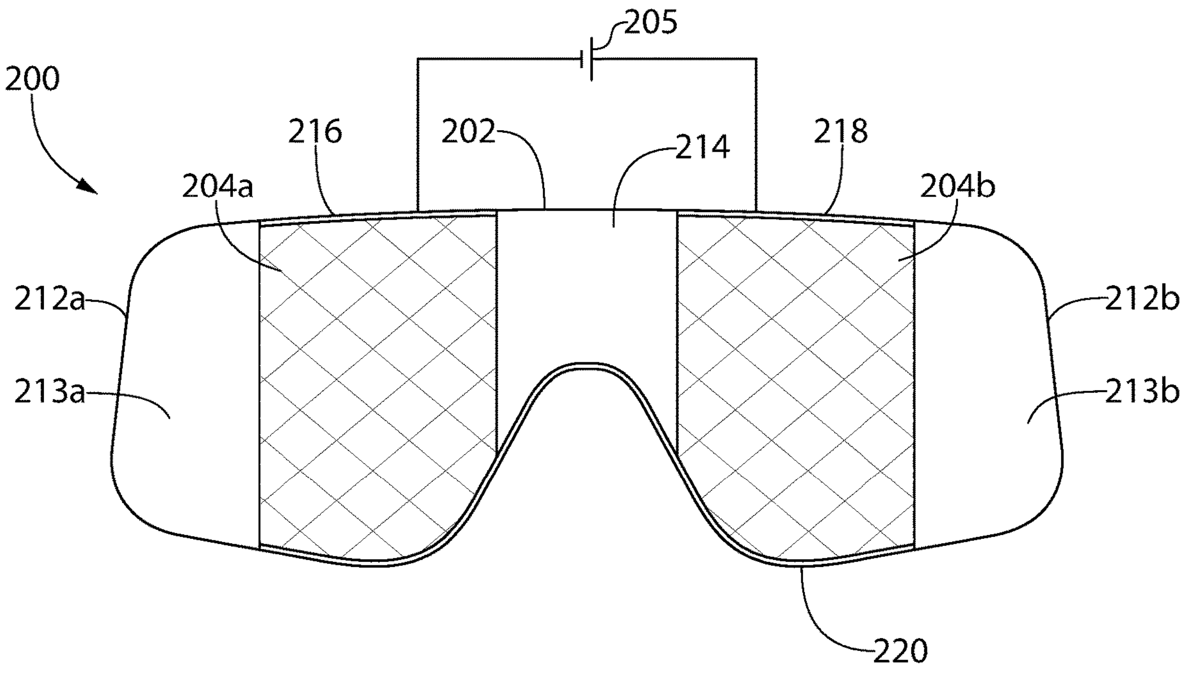
FIG. 2 is a schematic diagram illustrating an eye protection device in accordance with another exemplary embodiment of the present disclosure having an alternate TCL configuration.

Referring to FIG. 2, there is shown another embodiment of an eye protection device, generally designated 200, in accordance with an exemplary embodiment of the present disclosure. The eye protection device 200 is generally the same as the eye protection device 100, as shown and described above with reference to FIGS. 1A-1E, except that the first and second TCLs 204*a* 204*b* do not extend to the temporal regions 213*a*, 213*b* and/or temporal edges 212*a*, 212*b* of the lens 202. For example, the outer edge of the first and second TCLs 204*a*, 204*b*, may correspond to the outer edge of the first, second, and third bus bars 216, 218, and 220 respectively. As such, the nasal region 214, and temporal regions 213*a*, 213*b* may not be covered by the first and second TCLs 204*a*, 204*b*. In some embodiments, by not covering the nasal region 214 as well as the temporal regions 213*a*, 213*b* with the first and second TCLs 204*a*, 204*b*, the electrical current pathways may be contained to being directly between opposing bus bars 216, 218, 220. For example, there may be no curvatures in the electrical current pathway, as illustrated in FIG. 1E, in the eye protection device 200. It will be understood however, that heat generated by the first and second TCLs 204*a*, 204*b* may be conducted to the nasal region 214 and/or the temporal regions 213*a*, 213*b*.

In some embodiments, the first and second TCLs 204*a*, 204*b* are configured to require less electrical power to operate than the first and second TCLs 104*a*, 104*b* of the eye protection device 100. The amount of electrical power required to operate (e.g., generate heat) the TCLs of the present disclosure described herein may be positively related to the area of the respective TCL. For example, as the total area of a TCL decreases, the amount of electrical power required to operate said TCL may decrease as well. As such, the first and second TCLs 204*a*, 204*b* each define an area that is smaller than the area defined by a corresponding TCL 104*a*, 104*b*. In this manner, the eye protection device 200 may have a lower electrical power requirement than the eye protection device 100, which may be preferable in certain operating conditions (e.g., where lower heat generation output and/or longer runtime are required).

Figure 3:
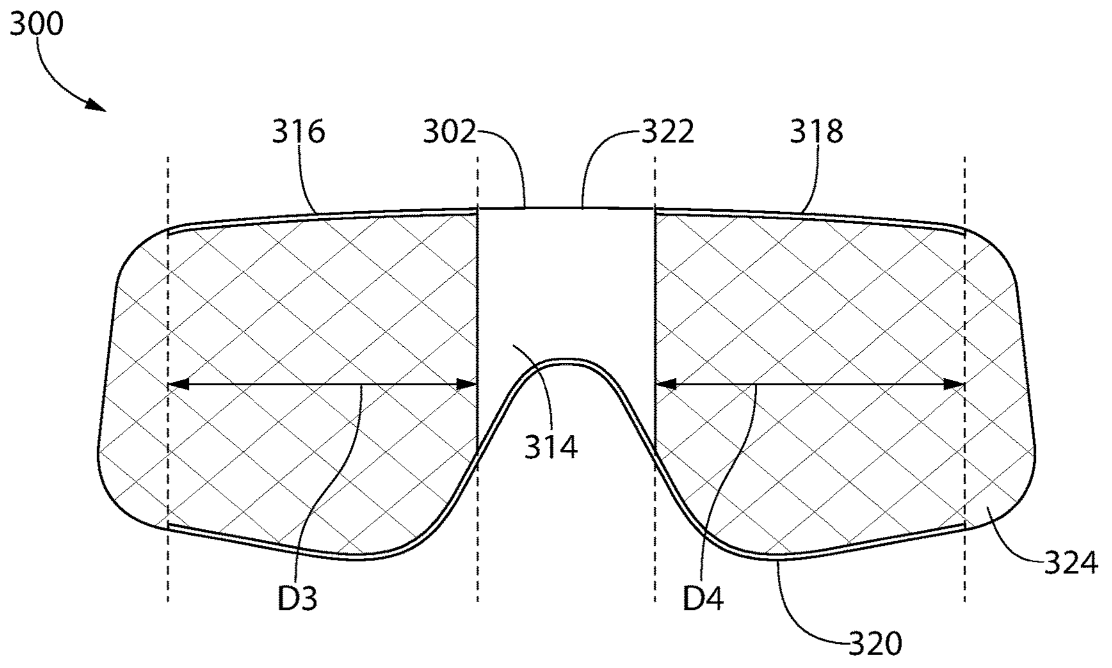
FIG. 3 is a schematic diagram illustrating an eye protection device in accordance with another exemplary embodiment of the present disclosure having an alternate TCL configuration.

Referring to FIG. 3, there is shown another embodiment of an eye protection device, generally designated 300, in accordance with an exemplary embodiment of the present disclosure. The eye protection device 300 is generally the same as the eye protection device 100, as shown and described above with reference to FIGS. 1A-1E, except that the first, second, and/or third bus bars 316, 318, 320 may extend along a periphery of the lens 302 by a distance greater than the distance $D_1$ of the first, second, and/or third bus bars 116, 118, 120. For example, the first bus bar 316 may extend along a periphery of the lens 302 proximate the top edge 322 by a distance $D_3$. The distance $D_3$ may be measured from an outer edge of the nasal region 314 where one terminal end of the first bus bar 316 is positioned, to the opposite terminal end of the first bus bar 316. Similarly, the second bus bar 318 may extend along a periphery of the lens 302 proximate the top edge 322 by a distance $D_4$. In some embodiments, the distances $D_3$ and $D_4$ are generally equal. In some embodiments, the distances $D_3$ and $D_4$ are greater than the distances $D_1$ and/or $D_2$ of the eye protection device 100. The third bus bar 320 may be positioned along a periphery of the lens 302 proximate the bottom edge 324 and have terminal ends that align with the outer terminal ends of the first and second bus bars 316, 318. In some embodiments, the third bus bar 320 extends along the bottom edge 324 of the lens by a distance generally equal to the distance $D_3$ plus the distance $D_4$ plus the distance across the nasal bridge between opposing outer edges.

Figure 4:
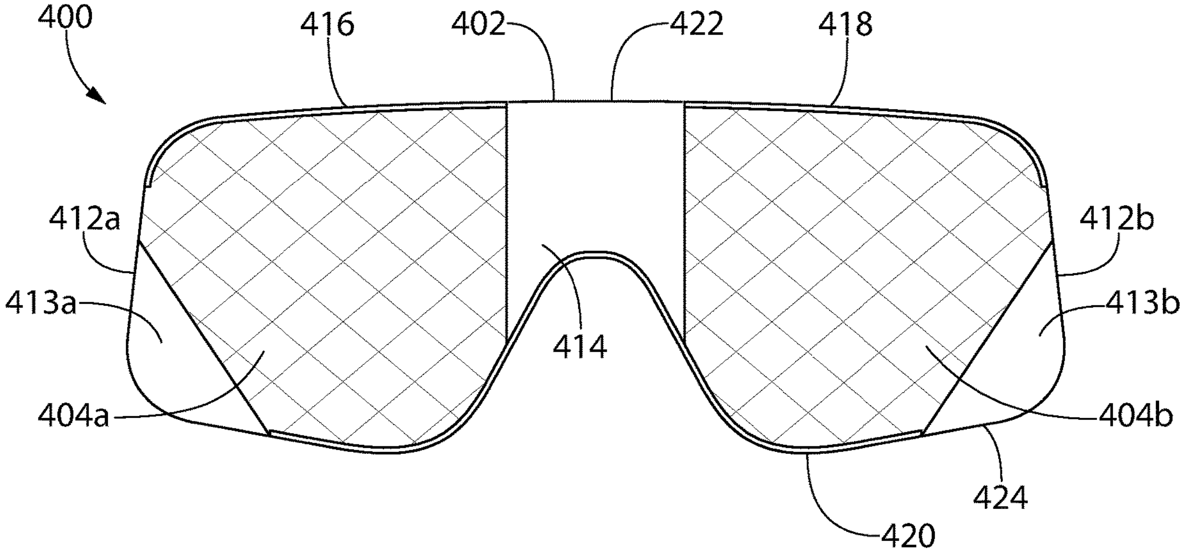
FIG. 4 is a schematic diagram illustrating an eye protection device in accordance with another exemplary embodiment of the present disclosure having an alternate TCL configuration.

Referring to FIG. 4 there is shown another embodiment of an eye protection device, generally designated 400, in accordance with an exemplary embodiment of the present disclosure. The eye protection device 400 is generally the same as the eye protection device 100, as shown and described above with reference to FIGS. 1A-1E, except that the first and second TCLs 404*a*, 404*b* do not cover the entire temporal regions 413*a*, 413*b* of the lens 402. For example, the first TCL 404*a* may extend to the first temporal edge 412*a* and be angled downward toward the bottom surface 424 of the lens 404 and inward toward the nasal region 414. As such, a bottom corner portion of the first temporal region 413*a* may not be covered by the first TCL 404*a*. Similarly, the second TCL 404*b* may extend to the second temporal edge 412*b* and be angled downward toward the bottom surface 424 of the lens 404 and inward toward the nasal region 414. As such, a bottom corner portion of the second temporal region 413*a* may not be covered by the second TCL 404*a*.

The eye protection device 400 may also be generally the same as the eye protection device 100 except that the first and second bus bars 416, 418 may extend partially along the temporal edges 412*a*, 412*b* of the lens 402. For example, the first bus bar 416 may extend along a periphery of the lens 402 along, or proximate, the top edge 422 from an outer edge of the nasal region 414 and partially along the first temporal edge 412*a*. Similarly, the second bus bar 418 may extend along a periphery of the lens 402 along, or proximate, the top edge 422 from the other outer edge of the nasal region 414 and partially along the second temporal edge 412*b*.

Figure 5:
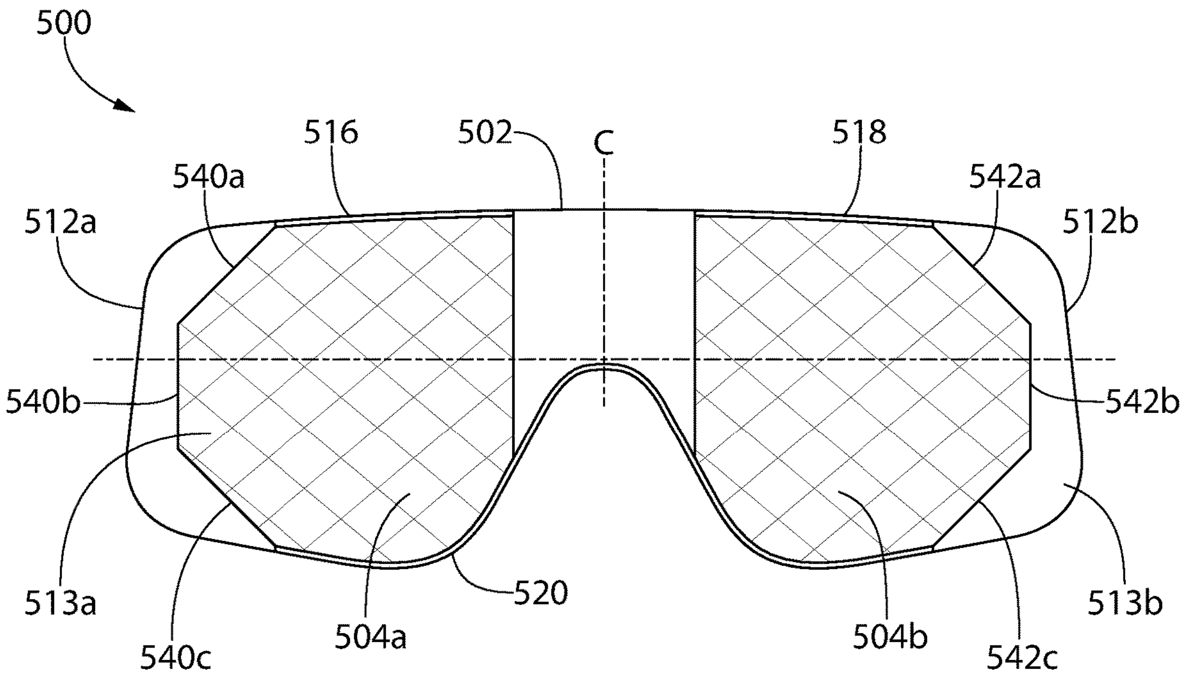
FIG. 5 is a schematic diagram illustrating an eye protection device in accordance with another exemplary embodiment of the present disclosure having an alternate TCL configuration.

Referring to FIG. 5, there is shown another embodiment of an eye protection device, generally designated 500, in accordance with an exemplary embodiment of the present disclosure. The eye protection device 500 is generally the same as the eye protection device 100, as shown and described above with reference to FIGS. 1A-1E, except that the first and second TCLs 504*a*, 504*b* may have a shape that is different from the first and second TCLs 104*a*, 104*b*. For example, the first TCL 504*a* and second TCL 504*b* may each include three linear outer edges that extend at different angles relative to one another. For example, the first TCL 504*a* may include a first outer edge 540*a* that extends downward from a terminal end of the first bus bar 516 at an angle between about 10 degrees to about 70 degrees. There may be a second outer edge 540*b* of the first TCL 504*a* that extends downwards from a terminal end of the first outer edge 540*a* generally vertically. There may be a third outer edge 540*c* that extends upwards from a terminal end of the third bus bar 420 at an angle between about 10 degrees to about 70 degrees and connects to the second outer edge 540*b*. As such, the first TCL 504*a* may not extend to the first temporal edge 512*a* and may not entirely cover the first temporal region 513*a* of the lens 502. Put another way, the first TCL 504*a* may partially cover the first temporal region 513*a* of the lens 502.

The second TCL 504*b* may be a mirror image of the first TCL 504*a* about a center line C of the lens 502. For example, the second TCL 504*b* may include first, second, and third outer edges 542*a*, 542*b*, 542*c* that are mirror images of the first, second, and third outer edges 540*a*, 540*b*, 540*c* of the first TCL 504*a*. The first outer edge 542*a* may extend downwardly from the second bus bar 518 and the third outer edge 542*c* may extend upwardly from a terminal end of the third bus bar 520 opposite where the third outer edge 540*c* extends upwardly from. As such, the second TCL 504*b* may not extend to the second temporal edge 512*b* and may not entirely cover the second temporal region 513*b* of the lens 502. Put another way, the second TCL 504*b* may partially cover the second temporal region 513*b* of the lens 502.

Figure 6:
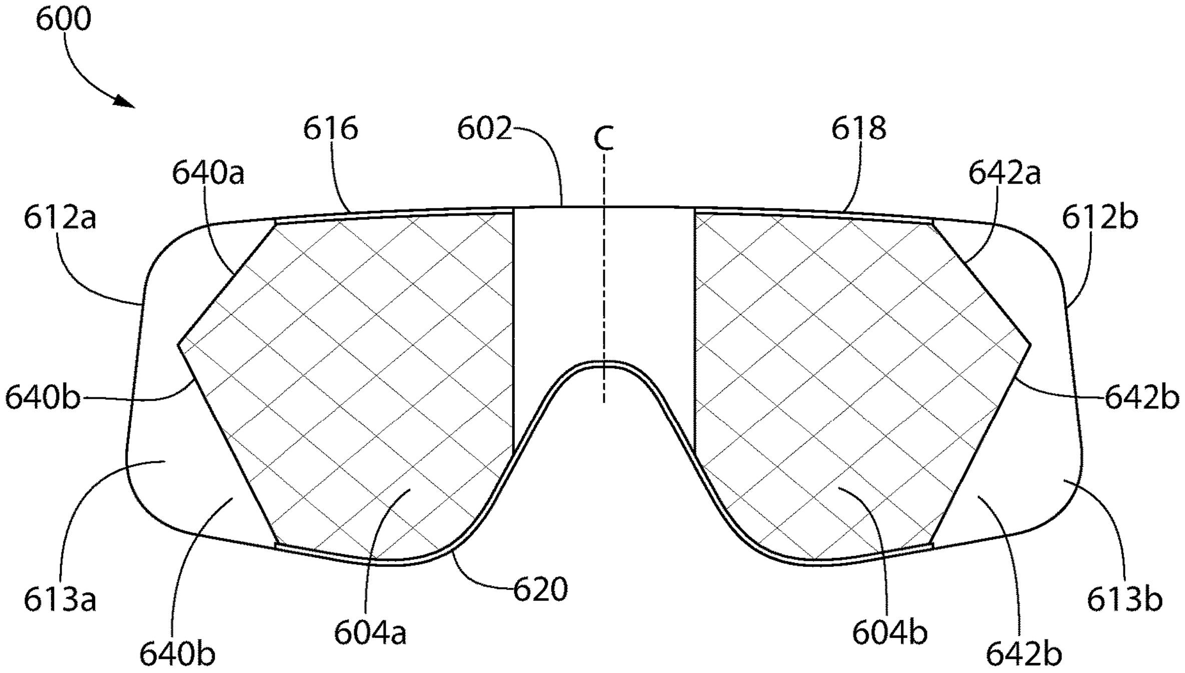
FIG. 6 is a schematic diagram illustrating an eye protection device in accordance with another exemplary embodiment of the present disclosure having an alternate TCL configuration.

Referring to FIG. 6, there is shown another embodiment of an eye protection device, generally designated 600, in accordance with an exemplary embodiment of the present disclosure. The eye protection device 600 is generally the same as the eye protection device 100, as shown and described above with reference to FIGS. 1A-1E, except that the first and second TCLs 604*a*, 604*b* may have a shape that is different from the first and second TCLs 104*a*, 104*b*. For example, the first TCL 604*a* and second TCL 604*b* may each include two linear outer edges that extend at different angles relative to one another. For example, the first TCL 604*a* may include a first outer edge 640*a* that extends downward from a terminal end of the first bus bar 516 at an angle between about 10 degrees to about 70 degrees. There may be a second outer edge 640*b* that extends upwards from a terminal end of the third bus bar 420 at an angle between about 10 degrees to about 70 degrees and connects to the first outer edge 640*b*. As such, the first TCL 604*a* may not extend to the first temporal edge 612*a* and may not entirely cover the first temporal region 613*a* of the lens 602. Put another way, the first TCL 604*a* may partially cover the first temporal region 613*a* of the lens 602.

The second TCL 604*b* may be a mirror image of the first TCL 604*a* about a center line C of the lens 602. For example, the second TCL 604*b* may include first and second edges 642*a*, 642*b* that are mirror images of the first and second outer edges 640*a*, 640*b* of the first TCL 604*a*. The first outer edge 642*a* may extend downwardly from the second bus bar 618 and the second outer edge 642*b* may extend upwardly from a terminal end of the third bus bar 520 opposite where the second outer edge 640*b* extends upwardly from. As such, the second TCL 604*b* may not extend to the second temporal edge 612*b* and may not entirely cover the second temporal region 613*b* of the lens 602. Put another way, the second TCL 604*b* may partially cover the second temporal region 613*b* of the lens 602.

Figure 7:
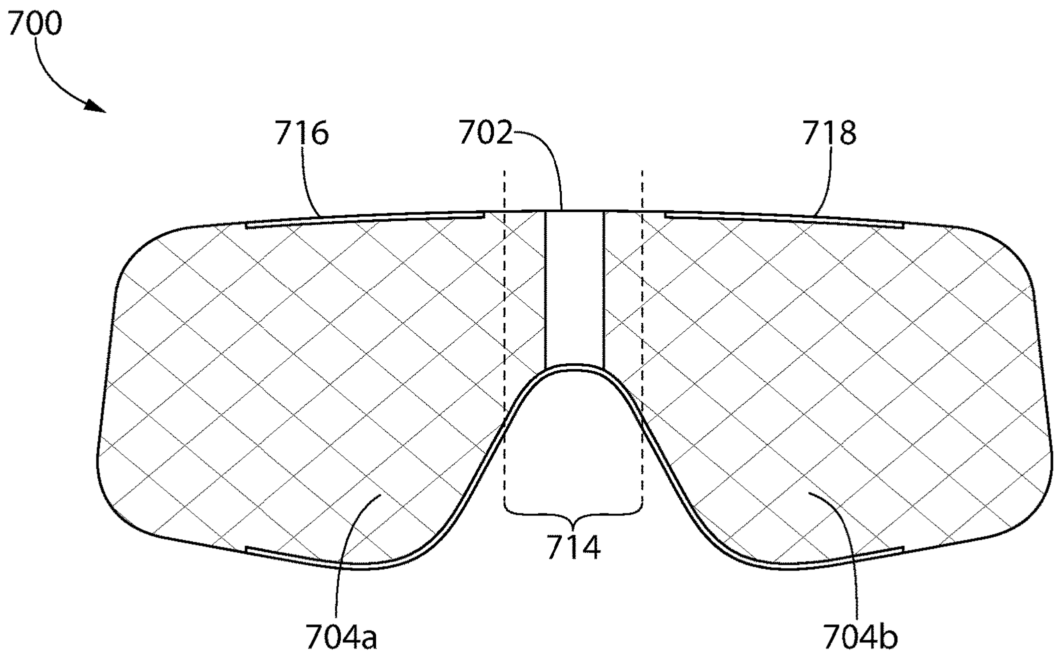
FIG. 7 is a schematic diagram illustrating an eye protection device in accordance with another exemplary embodiment of the present disclosure having an alternate TCL configuration.

Referring to FIG. 7 there is shown another embodiment of an eye protection device, generally designated 700, in accordance with an exemplary embodiment of the present disclosure. The eye protection device 700 is generally the same as the eye protection device 100, as shown and described above with reference to FIGS. 1A-1E, except that the first and second TCLs 704*a*, 704*b* may cover a substantial portion of the nasal bridge 714 of the lens 702. For example, a portion of the nasal bridge 714 may be covered by the first TCL 704*a* and second TCL 704*b* such that a smaller surface area of the nasal bridge 714 is devoid of a TCL when compared to any one of the eye protection devices 100, 200, 300, 400, 500, and 600 described above. In some embodiments, the first bus bar 716 and second bus bar 718 may extend at least partially within the nasal region 714. In such embodiments, the first bus bar 716 and second bus bar 718 may not directly contact one another.

Figure 8:
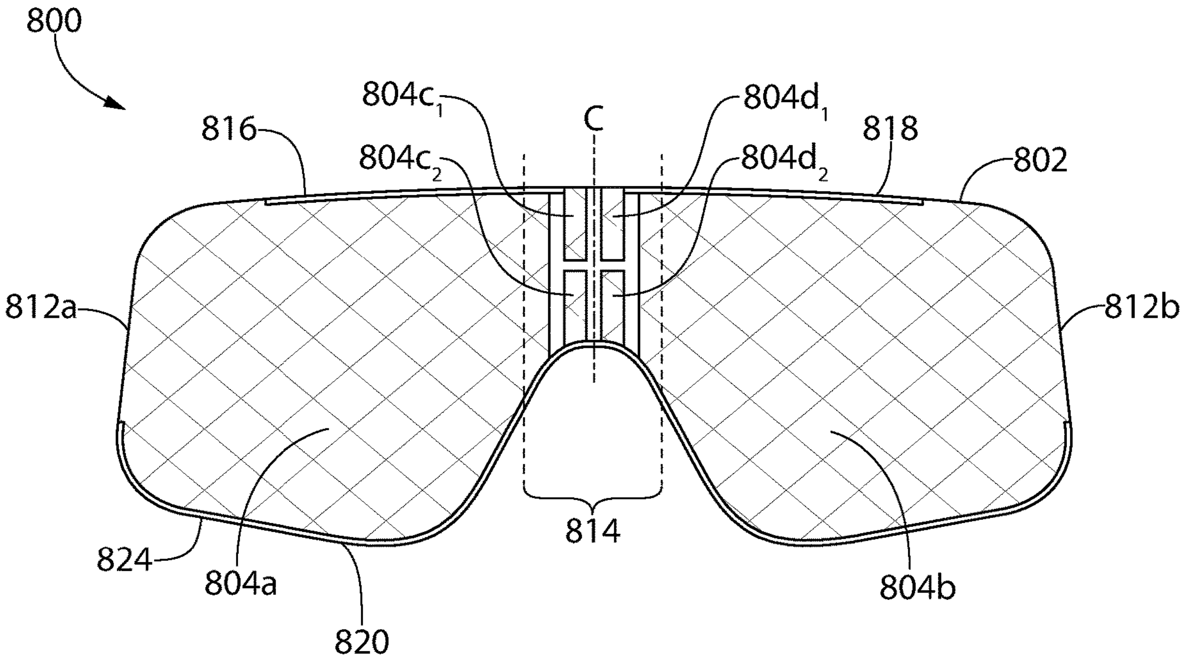
FIG. 8 is a schematic diagram illustrating an eye protection device in accordance with another exemplary embodiment of the present disclosure having an alternate TCL configuration.

Referring to FIG. 8 there is shown another embodiment of an eye protection device, generally designated 800, in accordance with an exemplary embodiment of the present disclosure. The eye protection device 800 is generally the same as the eye protection device 700, as shown and described above with reference to FIG. 7, except that there is a first TCL 804$c_1$, a second TCL 804$d_1$, third TCL 804$c_2$, and a fourth TCL 804$d_2$, positioned within the nasal region 814. Each of the TCLs 804$c_1$, 804$c_2$, 804$d_1$, and 804$d_2$ may define a corresponding heating region. In some embodiments, the TCLs 804$c_1$, 804$c_2$, 804$d_1$, and 804$d_2$ and 804*a*, 804*b* are created by, for example, depositing a single continuous TCL that substantially covers the entire surface of the lens 802 and laser etching the single continuous TCL to create TCLs 804$c_1$, 804$c_2$, 804$d_1$, and 804$d_2$ and 804*a*, 804*b*. Put another way, laser etching may be used to define the spacing between the TCLs 804$c_1$, 804$c_2$, 804$d_1$, and 804$d_2$ and 804*a*, 804*b*. In some embodiments, TCLs 804$c_1$, 804$c_2$, 804$d_1$, and 804$d_2$ may act as heat conductor but not a heating element. Put another way TCLs 804$c_1$, 804$c_2$, 804$d_1$, and 804$d_2$ may not be electrically connected to the bus bars 816, 818, 820, each other and/or to the first and second TCLs 804*a* and 804*b*. In other embodiments, the TCLs 804$c_1$, 804$c_2$, 804$d_1$, and 804$d_2$ are electrically connected to the bus bars 816, 818, 820 and act as heating elements configured to generate heat.

In some embodiments, the TCLs 804$c_1$, 804$c_2$, 804$d_1$, and 804$d_2$ are spaced from the first and second TCLs 804*a*, 804*b*. As such, each of the TCLs 804*a*, 804*b*, 804$c_1$, 804$c_2$, 804$d_1$, and 804$d_2$ may not directly contact one another. Although the TCLs 804*c*1, 804*c*2, 804*d*1, and 804*d*2, are depicted as being generally rectangular in shape, the TCLs 804$c_1$, 804$c_2$, 804$d_1$, and 804$d_2$ may define areas having complex geometries, patterns and/or any number of areas. In some embodiments, the TCLs 804$d_1$, and 804$d_2$ may define two areas, that are generally the same shape (e.g., mirror images of) as the areas defined by TCLs 804$c_1$, and 804$c_2$. In some embodiments, the TCL 804$c_1$, and 804$c_2$ and TCLs 804$d_1$ and 804$d_2$ are mirror images of one another across a center line C of the lens 802.

In some embodiments, the first bus bar 816 and second bus bar 818 may extend partially into the nasal region 814. The first bus bar 816 and second bus bar 818 may be spaced from one another such that they do not directly contact one another. In some embodiments, the first bus bar 816 is electrically connected to the TCL 804$c_1$ and the second bus bar 818 is electrically connected to the TCL 804*d*1. The third bus bar 820 may be electrically connected to the TCLs 804$c_2$ and 804$d_2$. In some embodiments, the third bus bar 820 may extend partially along the temporal edges 812*a*, 812*b* of the lens 802. For example, the third bus bar 820 may extend substantially along or proximate the bottom edge 824 of the lens and curve upwardly along a portion of the temporal edges 812*a*, 812*b* of the lens 802. The first bus bar 816, second bus bar 818, and third bus bar 820 may not directly contact one another.

Figure 9A:
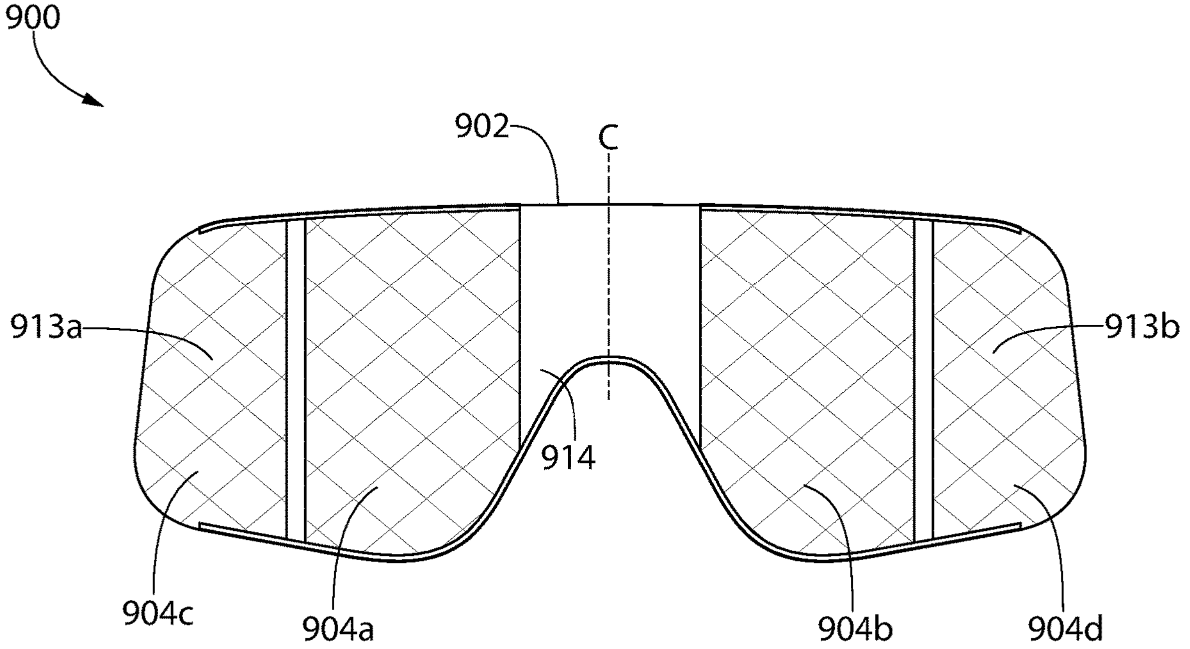
FIG. 9A is a schematic diagram illustrating an eye protection device in accordance with another exemplary embodiment of the present disclosure having an alternate TCL configuration.
Figure 9B:
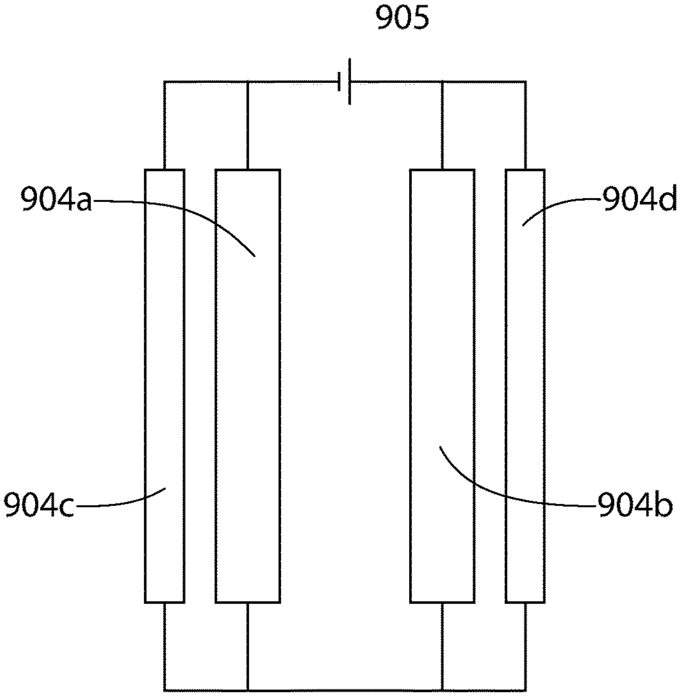
FIG. 9B is an electrical diagram illustrating the electrical connections of the eye protection device of FIG. 9A.

Referring to FIGS. 9A-9B there is shown another embodiment of an eye protection device, generally designated 900, in accordance with an exemplary embodiment of the present disclosure. The eye protection device 900 is generally the same as the eye protection device 100, as shown and described above with reference to FIGS. 1A-1E, except that there may be a third TCL 904*c* and a fourth TCL 904*d* covering portions of the lens 902. The first TCL 904*a* may extend from an outer edge of the nasal region 914 toward the first temporal region 913*a* and the third TCL 904*c* may extend from the first temporal edge 912*a* toward the first TCL 904*a*. The first TCL 904*a* and third TCL 904*c* may not directly contact one another, or put another way, the first TCL 904*a* may be spaced from the third TCL 904*c*. Similarly, the second TCL 904*b* may extend from an opposite outer edge of the nasal region 914 toward the second temporal region 913*b* and the fourth TCL 904*d* may extend from the second temporal edge 912*b* toward the second TCL 904*b*. The second TCL 904*b* and fourth TCL 904*d* may not directly contact one another, or, put another way the second TCL 904*b* may be spaced from the fourth TCL 904*d*.

In some embodiments, the third TCL 904*c* covers a substantial portion of the first temporal region 913*a* and the fourth TCL 904*d* covers a substantial portion of the second temporal region 913*b*. In some embodiments, the first bus bar 916 is electrically connected to the first TCL 904*a* and the third TCL 904*c*. Similarly, the second bus bar 918 may be electrically connected to the second TCL 904*b* and the fourth TCL 904*d*. The third bus bar 920 may be electrically connected to each of the TCLs 904*a*-904*d*. As such, the first and third TCLs 904*a*, 904*c* may be electrically connected in parallel and the second and fourth TCLs 904*b*, 904*d* may be electrically connected in parallel. In some embodiments, the first and third TCLs 904*a*, 904*c* may form a first grouping of TCLs and the second and fourth TCLs 904*b*, 904*d* may form a second grouping of TCLs and the two groupings may be electrically connected in series. For example, as illustrated in FIG. 9B, the parallel connected second and fourth TCLs 904*b*, 904*d* (second grouping) is electrically connected in series to the parallel connected first and third 904*a*, 904*c* (first grouping). As such, power may be transmitted from the power supply 905 to the second grouping of TCLs and to the first grouping of TCLs in series.

By providing the TCLs 904*a*-904*d* electrically connected as shown and described with reference to FIG. 9B, the eye protection device 900 may better match to a portable power supply 905. For example, better matching to the power supply 905 may be characterized to improved and/or optimized run times and energy usage efficiency. In some embodiments, the temporal regions 913*a*, 913*b* of the lens 902 may be covered by two or more TCLs that are connected in parallel with a respective first and second TCL 904*a*, 904*b*.

It will be appreciated by those skilled in the art that changes could be made to the exemplary embodiments shown and described above without departing from the broad inventive concepts thereof. It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways.

Specific features of the exemplary embodiments may or may not be part of the claimed invention and various features of the disclosed embodiments may be combined. Unless specifically set forth herein, the terms "a", "an" and "the" are not limited to one element but instead should be read as meaning "at least one". Finally, unless specifically set forth herein, a disclosed or claimed method should not be limited to the performance of their steps in the order written, and one skilled in the art can readily appreciate that the steps may be performed in any practical order.

What is claimed is:

1. An eye protection device comprising:

a lens;

a first transparent conductive layer (TCL) coupled to the lens and covering a first heating area on the lens;

a second TCL coupled to the lens and covering a second heating area on the lens, the second TCL and second heating area being spaced from the first TCL and first heating area;

a first bus bar electrically connected to the first TCL;

a second bus bar electrically connected to the second TCL and spaced from the first bus bar; and a third bus bar electrically connected to and extending between both the first TCL and the second TCL, wherein the third bus bar electrically connects the first TCL and second TCL in series such that current flows between the first TCL and the second TCL via the third bus bar.

2. The eye protection device of claim 1, wherein the first bus bar extends along a portion of a periphery of the lens and electrically connects to the first TCL, and wherein the second bus bar extends along another portion of the periphery of the lens and electrically connects to the second TCL.

3. The eye protection device of claim 2, wherein the third bus bar extends along another portion of the periphery of the lens opposite the first bus bar and second bus bar.

4. The eye protection device of claim 3, wherein the first bus bar, the second bus bar, and the third bus bar do not directly contact one another.

5. The eye protection device of claim 2, wherein the first bus bar and second bus bar each extend along a top surface of the lens by a distance generally equal to or less than a width of the first and second heating area respectively.

6. The eye protection device of claim 1, wherein the first TCL and second TCL have equal bulk electrical resistance values.

7. The eye protection device of claim 1, wherein the lens includes a concave rear surface and a convex front surface, and wherein the first and second TCL are mounted on the convex front surface of the lens.

8. The eye protection device of claim 1, wherein there is no TCL disposed on the lens in the space between the first heating area and second heating area.

9. The eye protection device of claim 8, wherein the space on the lens between the first heating area and second heating area is configured to align with a nasal bridge of a user wearing the eye protection device.

10. The eye protection device of claim 1 further comprising:

a first anti-reflection (AR) layer substantially covering the first TCL and the second TCL such that the first TCL and second TCL are sandwiched between the lens and the first AR layer; and a second AR layer substantially covering a surface of the lens opposite the first AR layer.

11. The eye protection device of claim 1, wherein the lens is a first lens, the eye protection device further comprising:

a second lens, the second lens being spaced from the first lens such that a gap is formed between the first lens and the second lens.

12. The eye protection device of claim 11, wherein at least one of the first lens and second lens includes a laser absorptive dye.

13. The eye protection device of claim 11, wherein the second lens is comprised of a ballistic grade material.

14. The eye protection device of claim 1, wherein the first TCL and second TCL are mirror images of one another across a center line of the lens.

15. The eye protection device of claim 1, wherein the first TCL and the second TCL each include indium tin oxide (ITO).

16. The eye protection device of claim 1, wherein the first TCL and second TCL are powered through connection to a powered helmet rail configured to power a plurality of devices.

17. The eye protection device of claim 1, wherein the lens includes a hydrophobic coating.

18. The eye protection device of claim 1 further comprising:

an optical element configured to attenuate light based on ambient light conditions.

19. The eye protection device according to claim 18, wherein the optical element includes one or more of photochromic, electrochromic or liquid crystal technology.

20. The eye protection device of claim 1 further comprising:

a laser light protective coating applied to the lens.

21. The eye protection device of claim 1 further comprising:

a display device configured to project an image to a user's eye.

22. An eye protection device comprising:

a lens including a concave rear surface and a convex front surface, the lens having a first heating area, a second heating area and a nasal region extending between the first and second heating areas, the nasal region configured to align with a nasal bridge of a user wearing the eye protection device;

a first transparent conductive layer (TCL) coupled to the convex front surface of the lens and covering the first heating area on the lens;

a second TCL coupled to the convex front surface of the lens and covering the second heating area on the lens, the second TCL and second heating area being spaced from the first TCL and first heating area;

a first bus bar extending along a portion of a periphery of the lens and electrically connected to the first TCL;

a second bus bar extending along another portion of the periphery of the lens and electrically connected to the second TCL; and a third bus bar extending along another portion of the periphery of the lens opposite the first and second bus bar and between the first TCL and the second TCL, the third bus bar being electrically connected to the first TCL and second TCL, wherein the first bus bar and second bus bar are spaced from one another, and wherein the third bus bar electrically connects the first TCL and second TCL in series such that current flows between the first TCL and second TCL via the third bus bar.

23. An eye protection device comprising:
- a lens including a concave rear surface and a convex front surface, the lens having a first heating area, a second heating area and a nasal region extending between the first and second heating areas, the nasal region configured to align with a nasal bridge of a user wearing the eye protection device;
- a first transparent conductive layer (TCL) coupled to the concave rear surface of the lens and covering the first heating area on the lens;
- a second TCL coupled to the concave rear surface of the lens and covering the second heating area on the lens, the second TCL and second heating area being spaced from the first TCL and first heating area;
- a first bus bar extending along a portion of a periphery of the lens and electrically connected to the first TCL;
- a second bus bar extending along another portion of the periphery of the lens and electrically connected to the second TCL;
- a third bus bar extending along another portion of the periphery of the lens opposite the first and second bus bar and between the first TCL and the second TCL, the third bus bar being electrically connected to the first TCL and second TCL,
- wherein the first bus bar and second bus bar are spaced from one another, and
- wherein the third bus bar electrically connects the first TCL and second TCL in series such that current flows between the first TCL and second TCL via the third bus bar.

24. An eye protection device comprising:
- a first lens including a concave rear surface and a convex front surface;
- a first transparent conductive layer (TCL) coupled to the convex front surface of the first lens and covering a first heating area on the first lens;
- a second TCL coupled to the convex front surface of the first lens and covering a second heating area on the first lens, the second TCL and second heating area being spaced from the first TCL and first heating area;
- a second lens including a concave rear surface and a convex front surface, the second lens being spaced from the first lens such that a gap is formed between the first and second lens;
- a first and second reinforced coating applied to the concave rear surface and convex front surface of the second lens;
- a first anti-reflective layer positioned on the convex front surface of the first lens and covering at least the first and second TCL;
- a second anti-reflective layer covering the concave rear surface of the first lens; and
- a hydrophobic coating covering the second anti-reflective layer such that the second anti-reflective layer is positioned between the concave rear surface of the first lens and the hydrophobic coating,
- wherein the first TCL and second TCL are electrically connected to one another in series.

* * * * *